(12) United States Patent
Kakii

(10) Patent No.: US 7,546,455 B2
(45) Date of Patent: Jun. 9, 2009

(54) DIGITAL CERTIFICATE TRANSFERRING METHOD, DIGITAL CERTIFICATE TRANSFERRING APPARATUS, DIGITAL CERTIFICATE TRANSFERRING SYSTEM, PROGRAM AND RECORDING MEDIUM

(75) Inventor: Hiroshi Kakii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 842 days.

(21) Appl. No.: 11/011,045

(22) Filed: Dec. 15, 2004

(65) Prior Publication Data

US 2005/0160476 A1 Jul. 21, 2005

(30) Foreign Application Priority Data

Dec. 16, 2003 (JP) ............................. 2003-418677
Nov. 19, 2004 (JP) ............................. 2004-336441

(51) Int. Cl.
H04L 9/00 (2006.01)
(52) U.S. Cl. .................................................. 713/156
(58) Field of Classification Search .................. 713/156
See application file for complete search history.

(56) References Cited

U.S. PATENT DOCUMENTS 6,816,900 B1 * 11/2004 Vogel et al. ................. 709/225

FOREIGN PATENT DOCUMENTS

| EP | 0 410 037 A1 | 1/1991 |
|---|---|---|
| EP | 1 096 721 A1 | 5/2001 |
| FR | 2 823 929 | 10/2002 |
| JP | 2002-251492 | 9/2002 |
| JP | 2002-353959 | 12/2002 |
| JP | 2003-304229 | 10/2003 |

OTHER PUBLICATIONS

Myers et al. X.509 Internet Public Key Infrastructure Online Certicate Status Protocol—OCSP, Jun. 1999, Network Working Group, Request for Coments: RFC 2560.*
Housley et al. Internet X.509 Public key Infrastructure Certificate and CRL Profile, Jan. 1999, Network Working Group, Request for Comments: RFC 2459.*
James M. Hayes, "Secure In-band Update of Trusted Certificates", IEEE Comput. Soc., XP-010358652, Jun. 16, 1999, pp. 168-173.

* cited by examiner

Primary Examiner—Gilberto Barron, Jr.
Assistant Examiner—Martin Jeriko P San Juan
(74) Attorney, Agent, or Firm—Oblon, Spivak, McClelland, Maier & Neustadt, P.C.

(57) ABSTRACT

A digital certificate transferring method for transferring a second digital certificate from a certificate transferring apparatus to a communication apparatus storing a first digital certificate which is different from the second digital certificate is provided. In the method, the certificate transferring apparatus transfers, to the communication apparatus via a safe communication channel established by using a first digital certificate, the second digital certificate and identifying information of a communication destination to which the communication apparatus accesses to request authentication using the second digital certificate.

17 Claims, 21 Drawing Sheets

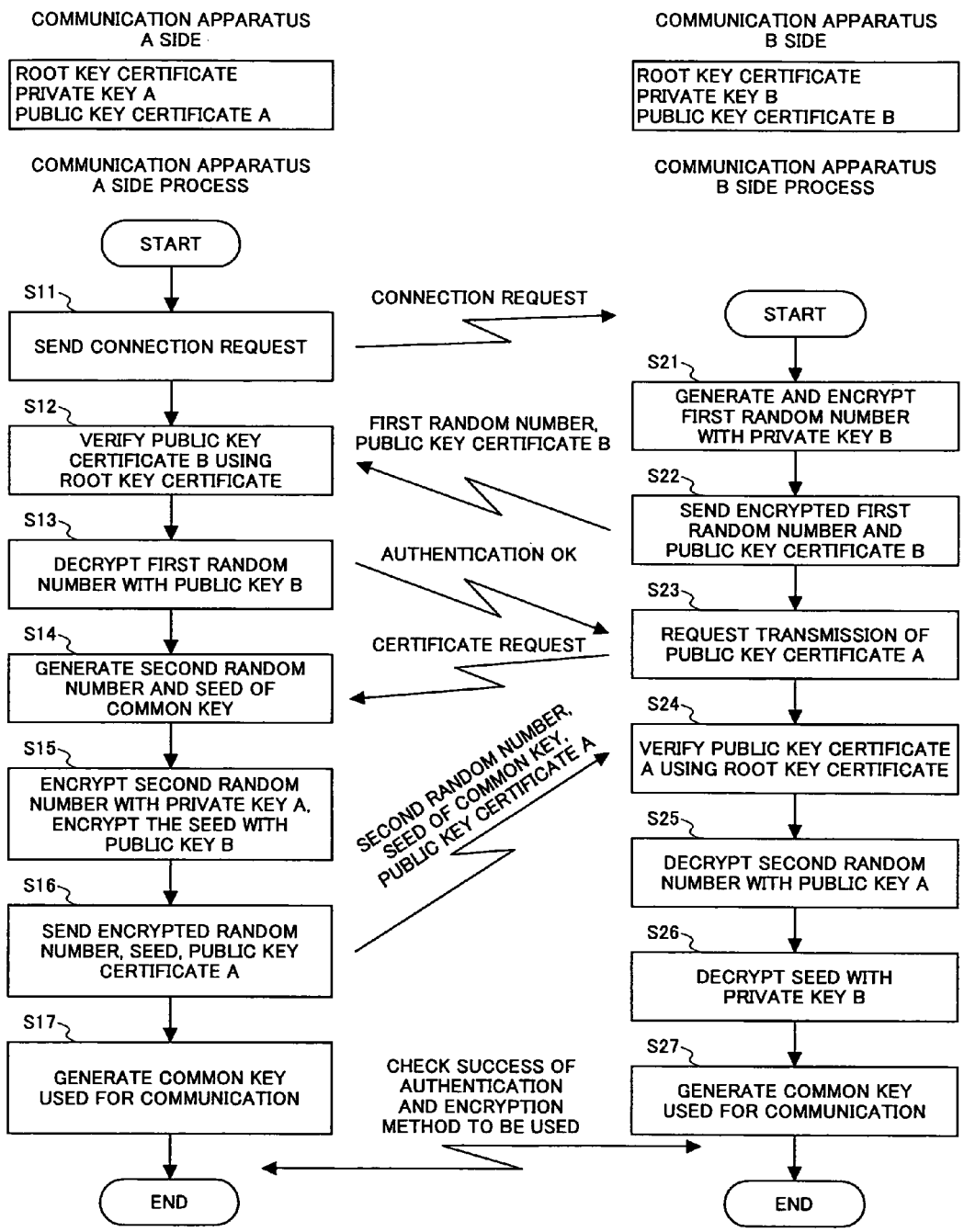

FIG.9

```
Data  (DATA PART)
  Version  (VERSION OF X.509)
  Serial Number  (SERIAL NUMBER)
  Signature Algorithm  (ENCRYPTION ALGORITHM USED BY CA)
  Issuer  (ISSUER OF CERTIFICATE)
  Validity  (TERM OF VALIDITY)
  Subject  (SUBJECT TO BE CERTIFIED)
  Subject Public Key Info   (INFORMATION ON PUBLIC KEY OF SUBJECT TO BE CERTIFIED)
    Public Key Algorithm
    RSA Public Key
    X509v3 extensions Signature Algorithm  (ENCRYPTION ALGORITHM USED IN CA)
Signature  (DIGITAL SIGNATURE BY CA)
```

FIG.10

Data:
    Version: 3 (0x2)
    Serial Number: 101 (0x0)
    Signature Algorithm: md5WithRSAEncryption
A——Issuer: C=JP, ST=Tokyo, L=Ohtaku, O=XXX Company, Ltd, CN=CA001
    Validity
B      Not Before: May 20 00:00:00 2002 GMT
       Not After : May 20 00:00:00 2003 GMT
C——Subject: C=JP, Tokyo, L=Ohtaku, O=XXX Company, Ltd, CN=Device-0123456
    Subject Public Key Info:
      Public Key Algorithm: rsaEncryption
      RSA Public Key: (1024 bit)
        Modulus (1024 bit): [PUBLIC KEY OF DEVICE-0123456]

Exponent: 65537 (0x10001)
Signature Algorithm: md5WithRSAEncryption
Signature: [SIGNATURE DATA BY CA001]

FIG.11

```
Data:
    Version: 3 (0x2)
    Serial Number: 1001 (0x0)
    Signature Algorithm: md5WithRSAEncryption
D──Issuer: C=JP, ST=Tokyo, L=Ohtaku, O=XXX Company, Ltd, CN=CA002
   ⎧Validity
E ⎨   Not Before: Jan 1 00:00:00 2003 GMT
   ⎩   Not After : Jan 1 00:00:00 2004 GMT
F──Subject: C=JP, Tokyo, L=Ohtaku, O=XXX Company, Ltd, CN=Device-0123456
    Subject Public Key Info:
        Public Key Algorithm: rsaEncryption
        RSA Public Key: (2048 bit)
            Modulus (2048 bit):
                [ PUBLIC KEY OF DEVICE-0123456 ]
            Exponent: 65537 (0x10001)
    Signature Algorithm: md5WithRSAEncryption
    Signature:
            [ SIGNATURE DATA BY CA002 ]
```

FIG.13

URL FOR SECOND CA

CERTIFICATE SET

SECOND CA PUBLIC KEY CERTIFICATE FOR LOWER APPARATUS

SECOND CA PRIVATE KEY FOR LOWER APPARATUS

SECOND CA ROOT KEY CERTIFICATE FOR AUTHENTICATING HIGHER APPARATUS

FIG.15

| ID | SECOND CA CERTIFICATE USE FLAG |
|---|---|
| ⋮ | |
| 012-3456 | ON |
| 012-3457 | ON |
| ⋮ | |
| 012-5001 | OFF |
| 012-5002 | OFF |
| ⋮ | |

DIGITAL CERTIFICATE TRANSFERRING METHOD, DIGITAL CERTIFICATE TRANSFERRING APPARATUS, DIGITAL CERTIFICATE TRANSFERRING SYSTEM, PROGRAM AND RECORDING MEDIUM

BACKGROUND OF THE INVENTION

1. Field of the Invention

The present invention relates to a technology for updating a digital certificate safely and easily.

2. Description of the Related Art

There are various systems in which communication apparatuses having communication functions are connected via a network. As an example of the system, there is a so-called electronic commerce system in which a computer such as a PC (personal computer) functioning as a client apparatus sends an order of a commodity, and a server connected to the computer via the Internet receives the order. In addition, a system is proposed in which functions of a client apparatus or a server apparatus are provided to various electronic apparatuses, and the electronic apparatuses are connected with each other via a network so that remote management for the electronic apparatuses are realized.

For constructing such systems, it is important to check whether a communication partner is valid or whether received information is not A tampered with. In addition, especially for the Internet, since data pass through a plurality of computers until the data are received by the communication partner, it is necessary to prevent tapping of secret information. For satisfying the above-mentioned requirements, a SSL (Secure Socket Layer) protocol has been developed, and the SSL is widely used. By performing communications by using the protocol, authentication of a communication partner is performed by using a combination of a public key encryption method and a common key encryption method, and tampering and tapping can be prevented by encrypting information. The communication partner can also authenticate a request origination apparatus.

Japanese laid-open patent application 2002-353959 and Japanese laid-open patent application 2002-251492 disclose technologies relating to the SSL and authentication by using the public key encryption, for example.

In the following, a communication procedure for performing mutual authentication by using the SSL is described. In the following description, authentication processes are mainly described. FIG. 1 is a flowchart showing processes performed by a communication apparatus A and a communication apparatus B in which the apparatuses perform mutual authentication according to the SSL. FIG. 1 also shows data used in the procedure.

As shown in FIG. 1, when performing mutual authentication based on the SSL, it is necessary to store a root key certificate, a private key and a public key certificate in each communication apparatus. The private key is a key owned by each apparatus. The public key certificate is a digital certificate generated, by a CA (certificate authority), by adding a digital signature of the CA to a public key corresponding to the private key. The root key certificate is a digital certificate generated by adding a digital signature of the CA to a public key corresponding to a private key of the CA used for the digital signature.

FIGS. 2A and 2B show relationships among the keys. As shown in FIG. 2A, the public key A includes a key body used for decrypting a document encrypted by a private key A, and bibliographic information including an issuer (CA) and an effective term of the public key and the like. The CA performs a hash process on the public key A to obtain a hash value, and encrypts the hash value by using the root private key and adds the encrypted hash value to the public key as a digital signature. In addition, identifying information of the root private key used for the digital signature is added to the bibliographic information of the public key A as signature key information. The public key A with the digital signature is the public key certificate A.

When using the public key certificate A in an authentication process, the digital signature is decrypted by using the root key that is a public key corresponding to the root private key. If the decryption is successfully done, it can be checked that the digital signature was added by the valid CA. In addition, it can be checked whether the key is not broken or tampered with by checking if the hash value obtained from the public key A is the same as the hash value obtained by decrypting the encrypted hash value. In addition, by checking whether received data can be decrypted by using the public key A, it can be checked that the data are sent from an owner of the private key A.

For performing authentication, it is necessary to store the root key beforehand. Also as to the root key, as shown in FIG. 2B, the root key is stored as a root key certificate to which a digital signature of the CA is added. The root key certificate is a self-signature type in which the digital signature can be decrypted by using a public key included in the root key certificate. When using the root key, the digital signature is decrypted by using a key body included in the root key certificate to obtain a hash value, so that the hash value is compared with a hash value calculated from the root key. If they are the same, it can be checked that the root key is not broken or the like.

The flowchart of FIG. 1 is described in the following. In the figure, arrows between two flowcharts indicate data transfers. A sending side performs a transmission process in a step at an originating point of the arrow. A receiving side that receives data from the sending side performs a step at a top of the arrow. In the procedure, if a process in a step does not successfully end, the process is interrupted at that time after sending a response indicating an authentication failure. Also, the process is interrupted in an communication apparatus when the communication apparatus receives the response indicating the authentication failure from the other party or when a timeout occurs in a process.

In this example, the communication apparatus A sends a communication request to the communication apparatus B. When sending the request, a CPU in the communication apparatus A starts the procedure of a flowchart in the left side of FIG. 1 by executing a control program. Then, in step S11, the communication apparatus A sends a connection request to the communication apparatus B.

When the communication apparatus B receives the connection request, the communication apparatus B starts a procedure indicated by a flowchart in the right side of FIG. 1 by executing a control program. In step S21, the communication apparatus B generates a first random number, and encrypts the first random number by using a private key B. Then, in step S22, the communication apparatus B sends the encrypted first random number and a public key certificate B to the communication apparatus A.

When the communication apparatus A receives the data, the communication apparatus A checks validity of the public key certificate B by using a root key certificate in step S12. After the public key certificate B is verified, the communication apparatus A decrypts the first random number by using a public key B in the public key certificate B in step S13. When the first random number is successfully decrypted, the communication apparatus A can ensure that the first random number is received from an issuing object of the public key certificate B. After that, the communication apparatus A sends information indicating success of authentication to the communication apparatus B.

When the communication apparatus B receives the information, the communication apparatus B requests the communication apparatus A to send a public key certificate to be used for authentication in step S23.

In response to that, the communication apparatus A generates a second random number and a seed of a common key in step S14. For example, the seed of the common key can be generated based on data exchanged in communications so far. The communication apparatus A encrypts the second random number by using the private key A, encrypts the seed of the common key by using the public key B in step S15, and sends these pieces of data and the public key certificate A to the communication apparatus B in step S16. In this process, the encryption of the seed of the common key is performed for preventing the seed from being known by apparatuses other than the communication apparatus B.

In a next step S17, a common key used for communications after that is generated by using the seed of the common key generated in step S14.

When the communication apparatus B receives the data, the communication apparatus B checks validity of the public key certificate A by using the root key certificate in step S24. After the validity is checked, the communication apparatus B decrypts the second random number by using the public key A included in the received public key certificate A. If the decryption is successfully done, it can be ensured that the second random number is received from an issuing object of the public key certificate A.

After that the communication apparatus B decrypts the seed of the common key by using the private key B. According to the processes described so far, the seed of the common key is shared between the communication apparatus A and the communication apparatus B. The seed of the common key is not known by any apparatus other than the communication apparatus A that generated the seed and the communication apparatus B having the private key B. When the processes so far are successfully done, the communication apparatus generates a common key used for communications from the seed of the common key in step S27.

After the step S17 in the communication apparatus A and the step S27 in the communication apparatus B end, the apparatuses mutually check the success of the authentication and check an encryption method used for later communications, and end the processes relating to authentication. In later communications, the common key is used in the encryption method. In the checking, a response indicating success of authentication is sent from the communication apparatus B. A communication channel is established by the above-mentioned processes. After that, communications can be performed in which data are encrypted by a common key encryption method using the common key generated in step S17 or S27.

By performing these processes, the communication apparatuses A and B can safely share the common key after performing mutual authentication, so that a route for performing communications safely can be established.

In the above-mentioned processes, it is not mandatory for the communication apparatus A to send the encrypted second random number and the public key certificate A to the communication apparatus B. If this process is not performed, the communication apparatus B cannot authenticate the communication apparatus A. However, when it is not necessary for the communication apparatus B to authenticate the communication apparatus A, the above process is not necessary. In this case, the communication apparatus A only stores the root key certificate, and the private key A and the public key certificate A are not necessary. It is not necessary to store the root key certificate in the communication apparatus B.

In the above-mentioned authentication processes, there is a possibility that a strength of the encryption is not enough due to advance of technologies. For example, after a high performance computer or a superior algorithm is developed, if a public key having a short length is used, there is a possibility that a private key corresponding to the public key is derived from the public key in a short time. Against this problem, it is required that the length of the pubic key can be changed. In addition, it is also required that a format of the public key certificate can be changed.

For changing the length of the public key or the format, it is necessary to provide a new CA. However, if a new CA is provided, validity of a new digital certificate cannot be verified by using the previous root key, so that the authentication process cannot be performed. Therefore, it is necessary to provide an apparatus to perform authentication with a new public key certificate, a new private key and a new root key certificate which correspond to the new key length or the new format. For storing the certificate, the key and the like into a newly manufactured apparatus, an technology described in a document "RSA Keon Factory-CA solution", [online], RSA security, URL: http://www.rsasecurity.com/japan/products/keon/keon_fac t (26 Nov. 2003) may be used.

However, the document does not disclose any method for distributing the certificate corresponding to the new key length and the new format to an apparatus that has been shipped and is operating in a customer's site.

Especially, for realizing the above-mentioned authentication in a system operated automatically like the remote management system of the above-mentioned electronic apparatuses, each managed apparatus should automatically select a communication request destination, a digital certificate and a key used for performing authentication processes. In addition, it is preferable to set a new certificate automatically.

However, for realizing the above-mentioned processes, there is a problem in that operation load and application development load may increase and that security may decrease. For example, in a case where a new certificate is distributed to an apparatus, if a communication partner of the apparatus receives accesses from the apparatus at a destination same as that for an old certificate, the destination should support both certificates so that processes are complicated and process load may increase. In addition, if a safe communication channel cannot be established between the communication partner and the apparatus, there is a possibility that exchanged data may be tapped or tampered with so that security may be degraded.

SUMMARY OF THE INVENTION

An object of the present invention is to provide technologies in which operations for updating a digital certificate of a communication apparatus so as to change a communication method to use a new digital certificate can be performed easily and safely.

The above object is achieved by a digital certificate transferring method for transferring a second digital certificate from a certificate transferring apparatus to a communication apparatus storing a first digital certificate which is different from the second digital certificate, wherein:

the certificate transferring apparatus transfers, to the communication apparatus via a safe communication channel established by using the first digital certificate, the second digital certificate and identifying information of a communication destination which the communication apparatus should access for communicating with the certificate transferring apparatus by using the second digital certificate.

In the digital certificate transferring method, the certificate transferring apparatus may transfer the second digital certificate together with the identifying information of the communication destination.

In the digital certificate transferring method, a key used for verifying the first digital certificate is different from a key used for verifying the second digital certificate.

In the digital certificate transferring method, wherein the certificate transferring apparatus may transfer the second digital certificate and the identifying information of the communication destination if the certificate transferring apparatus verifies the communication apparatus by using the first digital certificate.

In the digital certificate transferring method, wherein the certificate transferring apparatus may transfer the second digital certificate and the identifying information of the communication destination if the certificate transferring apparatus receives a communication request from the communication apparatus and if the certificate transferring apparatus has a setting indicating the second digital certificate needs to be sent to the communication apparatus.

In the digital certificate transferring method, the certificate transferring apparatus may request the communication apparatus to set the second digital certificate and the identifying information of the communication destination in the communication apparatus when the certificate transferring apparatus sends the second digital certificate and the identifying information to the communication apparatus.

According to the present invention, operations for updating a digital certificate of a communication apparatus so as to change a communication method to use a new digital certificate can be performed easily and safely.

BRIEF DESCRIPTION OF THE DRAWINGS

Other objects, features and advantages of the present invention will become more apparent from the following detailed description when read in conjunction with the accompanying drawings, in which:

FIG. 1 is a flowchart showing processes performed by a communication apparatus A and a communication apparatus B in which the apparatuses perform mutual authentication according to a SSL protocol;

FIG. 9 shows an example of a format of a public key certificate;

FIG. 10 shows an example of a public key certificate generated according to a format shown in FIG. 6 by a first CA;

FIG. 11 shows an example of a public key certificate issued by a second CA;

FIG. 13 shows an example of information transferred from the higher apparatus to the lower apparatus;

FIG. 15 is a setting example of second CA certificate use flags in the higher apparatus;

DETAILED DESCRIPTION OF THE PREFERRED EMBODIMENTS

In the following, preferred embodiments of the present invention are described. First, a digital certificate transferring apparatus and a digital certificate transferring system including the digital certificate transferring apparatus are described, in which the digital certificate transferring apparatus performs processes of a digital certificate transferring method of the present invention.

Figure 2A:
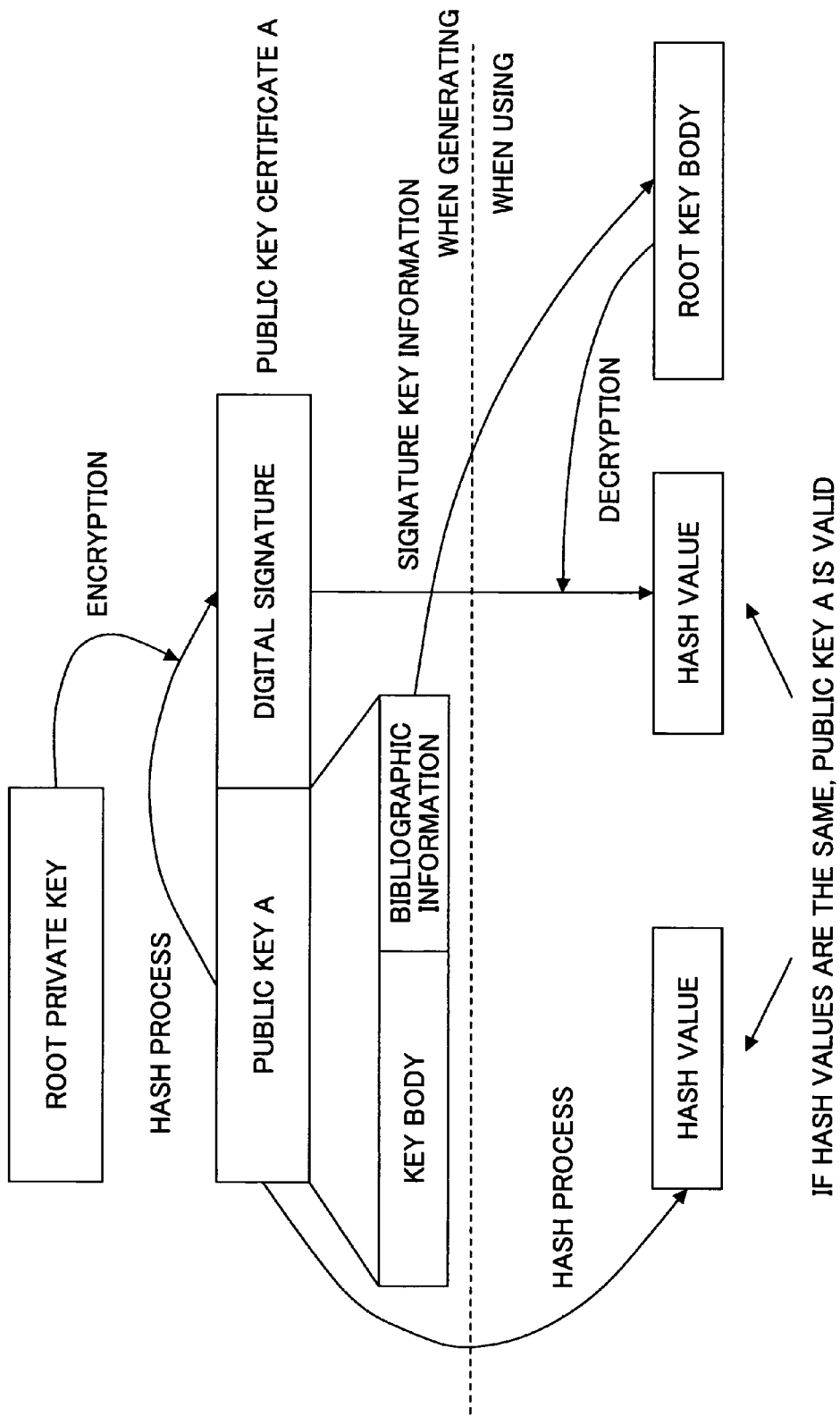
FIGS. 2A and 2B show relationships among a root key, a root private key and a public key certificate in the procedure shown in FIG. 1.
Figure 2B:
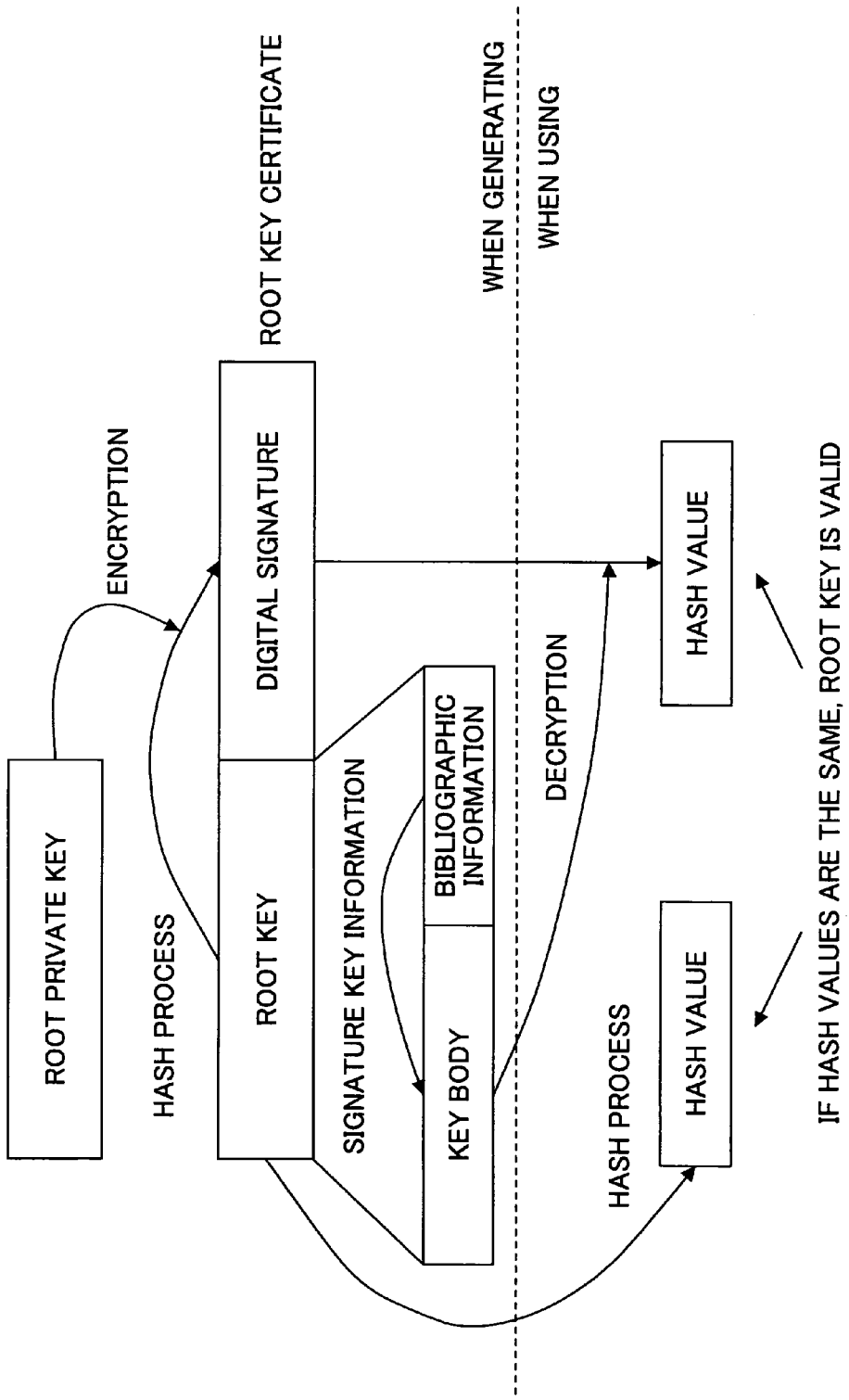
Figure 3:
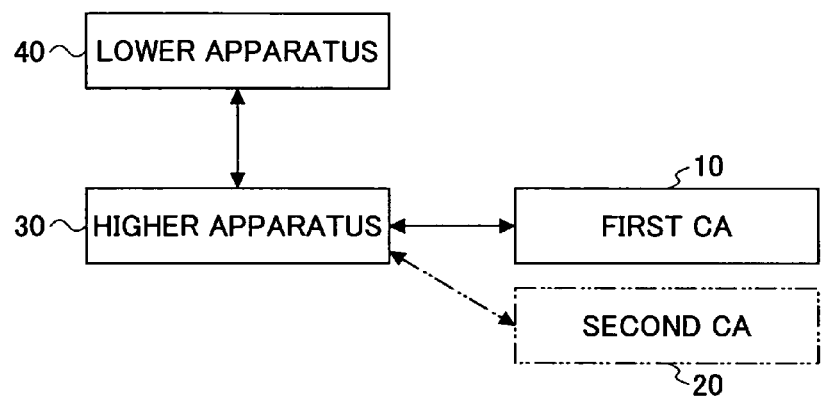
FIG. 3 shows a configuration of a certificate transferring system according to an embodiment of the present invention.

FIG. 3 shows a configuration of the digital certificate transferring system.

In this embodiment, the digital certificate transferring system includes a higher apparatus 30 that is the digital certificate transferring apparatus, and a lower apparatus 40 that is a communication apparatus that is a communication partner of the higher apparatus 30. The higher apparatus 30 can communicate with a first certification authority apparatus (to be referred to as "first CA") 10 that issues a digital certificate to the higher apparatus 30 and the lower apparatus 40. A second certification authority apparatus (to be referred to as "second CA") 20 is described later.

In the digital certificate transferring system, before the higher apparatus 30 performs communications with the lower apparatus 40, the higher apparatus 30 authenticates the lower apparatus 40 by performing an authentication process according to the SSL that uses an authentication method using a public key and a digital certificate. The communication between the higher apparatus 30 and the lower apparatus 40 can be performed only if the authentication is successfully done. In the communication, the higher apparatus 30 sends a request, and the lower apparatus 40 performs a process in response to the request, so that the system functions as a client-server system.

Inversely, when the lower apparatus 40 communicates with the higher apparatus 30, the lower apparatus 40 authenticates the higher apparatus 30 by performing an authentication process according to the SSL protocol. The communication between the higher apparatus 30 and the lower apparatus 40 can be performed only if the authentication is successfully done. In the communication, the lower apparatus 40 sends a request, and the higher apparatus 30 performs a process in response to the request, so that the system functions as a client-server system.

In either case, an apparatus sending a request functions as a client, and an apparatus receiving the request functions as a server.

The first CA 10 is an apparatus that issues and manages the digital certificate used in the above-mentioned mutual authentication.

Figure 20:
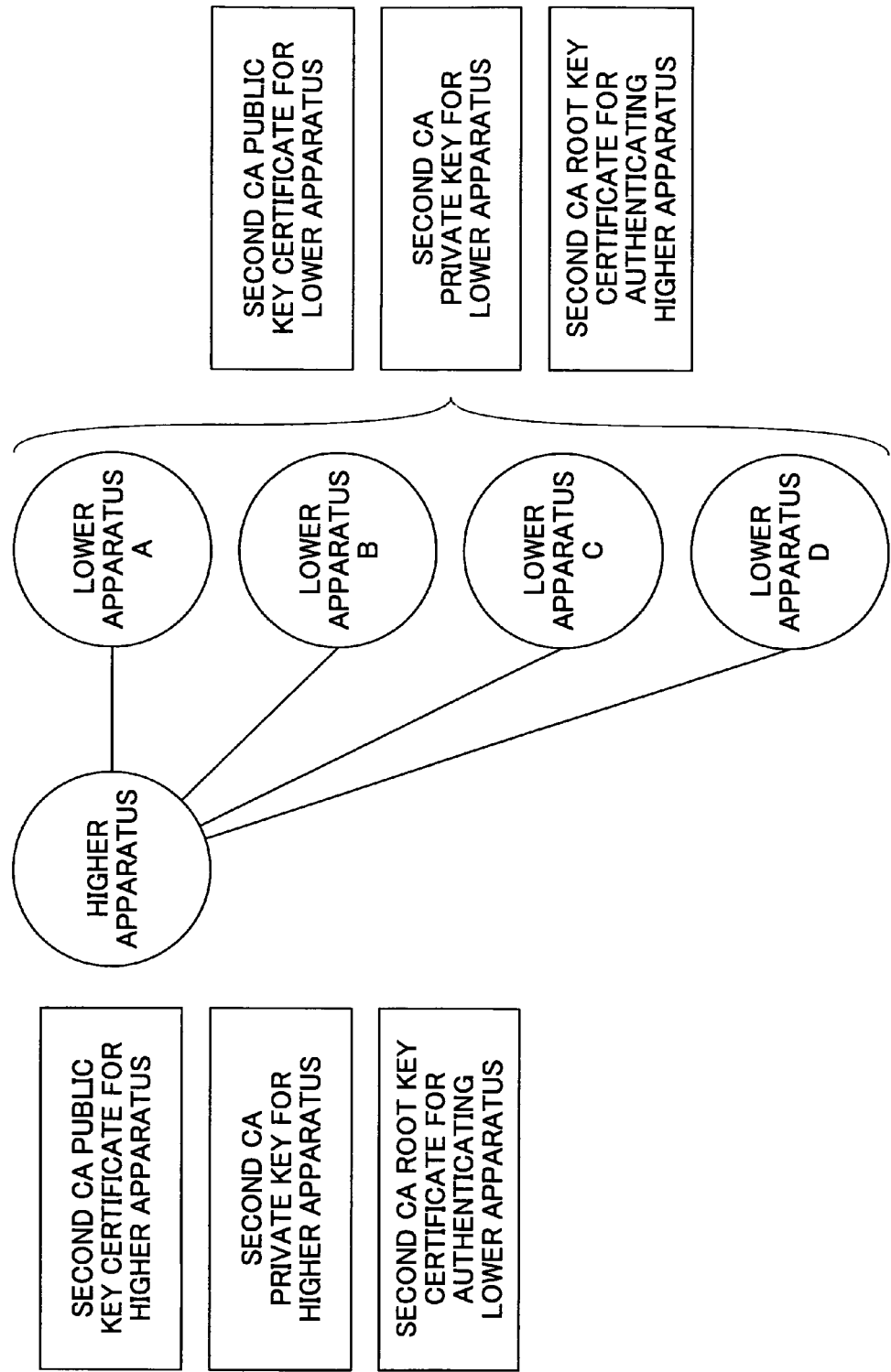
FIG. 20 shows a system configuration example in which a plurality of lower apparatuses are provided.

In FIG. 3, although only one lower apparatus 40 is shown, a plurality of lower apparatuses can be provided as shown in FIG. 20. Although only one higher apparatus 30 is provided in the digital certificate transferring system, one first CA 10 can communicate with a plurality of higher apparatuses 30 so that the first CA 10 may communicate with a plurality of digital certificate transferring system.

In the digital certificate transferring system, each of the first CA 10, the higher apparatus 30 and the lower apparatus 40 includes an application and is configured to be able to send a request by a RPC (remote procedure call) and to receive a response that is a result of a process corresponding to the request, in which the request is for requesting a destination apparatus to execute a method in the application.

For realizing the RPC, a known technology such as SOAP (Simple Object Access Protocol), HTTP (Hyper Text Transfer Protocol), FTP (File Transfer Protocol), COM (Component Object Model), CORBA (Common Object Request Broker Architecture) and the like can be used.

Next, configurations and functions of each apparatus shown in FIG. 3 are described in detail.

Figure 4:
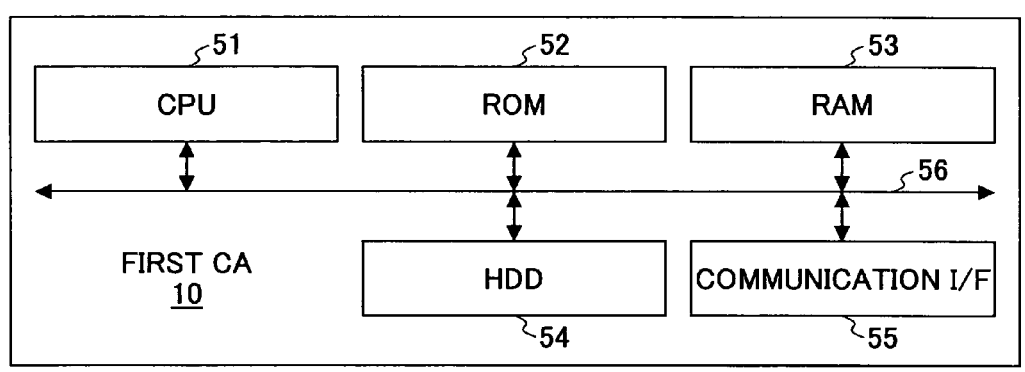
FIG. 4 is a block diagram showing a hardware configuration of a first CA 10 shown in FIG. 3.

FIG. 4 is a block diagram showing a hardware configuration of the first CA 10. As shown in FIG. 4, the first CA includes a CPU 51, a ROM 52, a RAM 53, a HDD 54 and a communication interface (I/F) 55 that are connected by a system bus 56. The CPU 51 controls operations of the first CA 10 by executing various control programs stored in the ROM 52 and the HDD 54, so that the first CA 10 issues and manages digital certificates. The first CA can be realized by a general computer. Other hardware can be added as necessary.

A configuration of each of the higher apparatus 30 and the lower apparatus 40 can vary according to a purpose of the apparatus such as remote management, electronic commerce and the like. In the remote management purpose, the lower apparatus 40 may become a managed apparatus. The managed apparatus may be an image forming apparatus such as a printer, a fax machine, a copy machine, a scanner and a digital compound machine and the like, and the managed apparatus may be an electronic apparatus such as a network household electrical appliance, a vending machine, medical equipment, a power supply, an air conditioner, a measuring system for gas, electricity, water and the like, a car, an aircraft and the like. In this case, the higher apparatus 30 becomes a managing apparatus that collects data from the managed apparatus and that sends a command to operate the managed apparatus. In any configurations, the higher apparatus 30 has a function for transferring a digital certificate and communication destination information to the lower apparatus as described later.

Each of the higher apparatus 30 and the lower apparatus 40 includes at least a CPU, a ROM, a RAM, a communication I/F for communicating with an external apparatus, and a storage for storing information necessary for performing authentication, in which the CPU causes the apparatus to realize each function of the present invention by executing control programs stored in the ROM and the like.

Various communication lines (routes) can be used for performing communications between the higher apparatus and the lower apparatus and between the higher apparatus and the first CA 10 regardless whether the communication line is a wired line or a wireless line. But, it is preferable to use a private line for the communication between the higher apparatus and the first CA 10 in consideration of security. In this embodiment, the private line is used for the communication.

Figure 5:
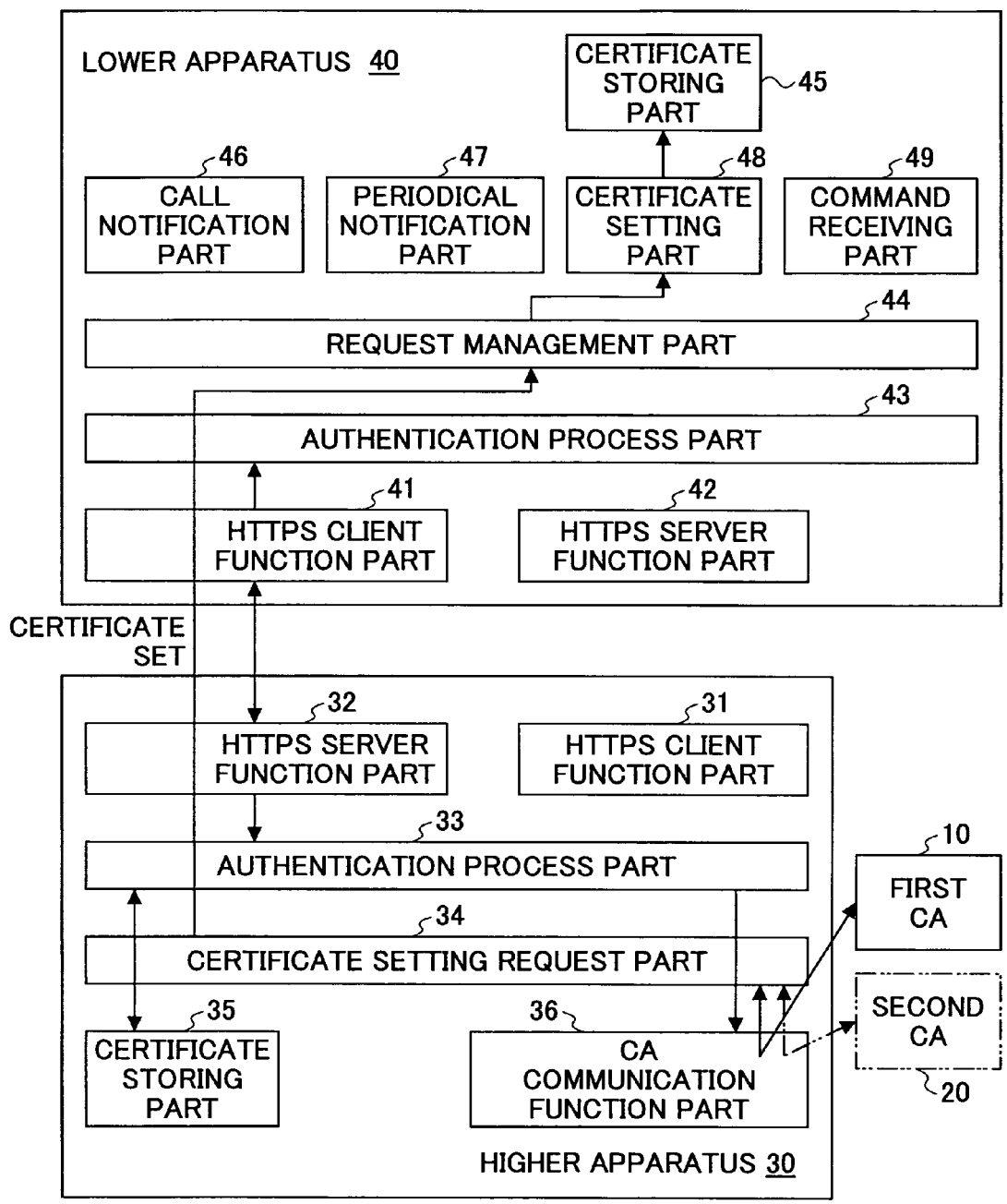
FIG. 5 is a block diagram showing functional configurations of a higher apparatus 30 and a lower apparatus 40 relating to features of the present invention.

FIG. 5 is a block diagram showing functional configurations of the higher apparatus 30 and the lower apparatus 40 relating to features of the present invention. In the figure, parts that do not relate to the features of the present invention are not shown.

The higher apparatus 30 includes a HTTP (Hypertext Transfer Protocol Security) client function part 31, a HTTP server function part 32, an authentication process part 33, a certificate setting request part 34, a certificate storing part 35, and a CA communication function part 36 (that can be also referred to as a communication function part for CA).

The HTTP client function part 31 has a function for sending a communication request to an apparatus such as the lower apparatus 40 that has a function of a HTTPS server by using a HTTPS protocol. The HTTPS protocol includes functions for authentication and encryption based on SSL.

The HTTPS server function part 32 includes a function for receiving a communication request using the HTTPS protocol sent from an apparatus having a HTTPS client function. The HTTPS client function part 31 and the HTTPS server function part 32 realize a first function and a second function, in which the first function is for sending an operation request (a command) and data to a communication partner to cause the communication partner to operate according to the command, and the second function is for receiving a request and data from the communication partner to cause each part of the apparatus to operate according to the request and to send a response to the request source. In this case, an apparatus that sends a communication request may send an operation request, and an apparatus that receives a communication request may send an operation request. This applies also to a response.

When the HTTPS client function part 31 or the HTTPS server function part 32 performs authentication for a communication partner, the authentication process part 33 performs an authentication process by using a digital certificate received from the communication partner, and by using a certificate and a private key and the like stored in the certificate storing part 35. In addition, the authentication process part 33 has a function for sending a digital certificate stored in the certificate storing part 35 to a communication partner via the HTTPS client function part 31 or the HTTPS server function part 32 to request the communication partner to perform authentication.

The certificate setting request part 34 transfers a certificate set, a certificate package or communication destination information to a communication partner such as the lower apparatus 40 in an after-mentioned predetermined case. In addition, the certificate setting request part 34 requests the destination apparatus to set the certificate and the the like.

The certificate storing part 35 stores authentication information such as various certificates and private keys and provides the authentication process part 33 with the authentication information.

The CA communication function part 36 communicates with a certification authority such as a first CA 10 and a second CA 20 to request the CA to issue a certificate set used for an authentication process by the lower apparatus 40 or the higher apparatus 30, and receives the issued certificate set. In this embodiment, communications between the higher apparatus 30 and the CA are performed via a private line. Thus, the SSL is not used. However, when SSL is used, the HTTPS client function part 31 may send a communication request to a CA. The functions of each part are realized by executing control programs in the higher apparatus 30.

The lower apparatus 40 includes a HTTPS client function part 41, a HTTPS server function part 42, an authentication process part 43, a request management part 44, a certificate storing part 45, a call notification part 46, a periodical notification part 47, a certificate setting part 48 and a command receiving part 49.

Like the HTTPS client function part 31 in the higher apparatus 30, the HTTPS client function part 41 has a function for sending a communication request to an apparatus such as the higher apparatus 30 that has a function of a HTTPS server by using the HTTPS protocol. In addition, the HTTPS client function part 41 has a function for sending and receiving an operation request and a response.

Like the HTTPS server function part 32 of the higher apparatus 30, the HTTPS server function part 42 includes a function for receiving a communication request sent from an apparatus having a HTTPS client function. In addition, the HTTPS server function part 42 has a function for sending and receiving an operation request and a response.

The authentication process part 43 functions in the same way as the authentication process part 33 of the higher apparatus 30, but the authentication process part 43 uses certificates and the like stored in the certificate storing part 45.

The request management part 44 determines whether the lower apparatus can perform an operation corresponding to a request received from the higher apparatus. When the operation is permitted to perform, the request management part 44 sends an operation request to function parts 46-49 each performing an operation corresponding to a request.

Like the certificate storing part 35 of the higher apparatus, the certificate storing part 45 stores authentication information such as various certificates and private keys. Data stored in the certificate storing part 45 are different from those in the certificate storing part 35.

When an abnormal event is detected or when receiving an instruction form a user, the call notification part 46 sends a call for notifying the higher apparatus 30 of the event. The call may be sent as a response for an inquiry from the higher apparatus by polling, or may be sent to the higher apparatus by requesting a communication with the higher apparatus from the HTTPS client function part 41.

The periodic notification part 47 has a function for performing periodical notification from the lower apparatus 40 to the higher apparatus 30. Information that is notified of may be a value of an image forming number counter in an image forming apparatus, or a measured value in a measuring system, for example. Since this notification is not urgent, the notification may be sent as a response for an inquiry by polling from the higher apparatus 30.

The certificate setting part 48 stores a certificate and the like received from the higher apparatus 30 as data to be used for an authentication process, and updates the certificate and the like.

The command receiving part 49 performs an operation corresponding to a request for a function other than functions of the function parts 46-48. For example, the operation may be a sending operation of data stored in the lower apparatus 40, or a control operation for an engine part not shown in the figures.

The functions of each part can be realized by executing control programs in the lower apparatus 40.

Figure 6:
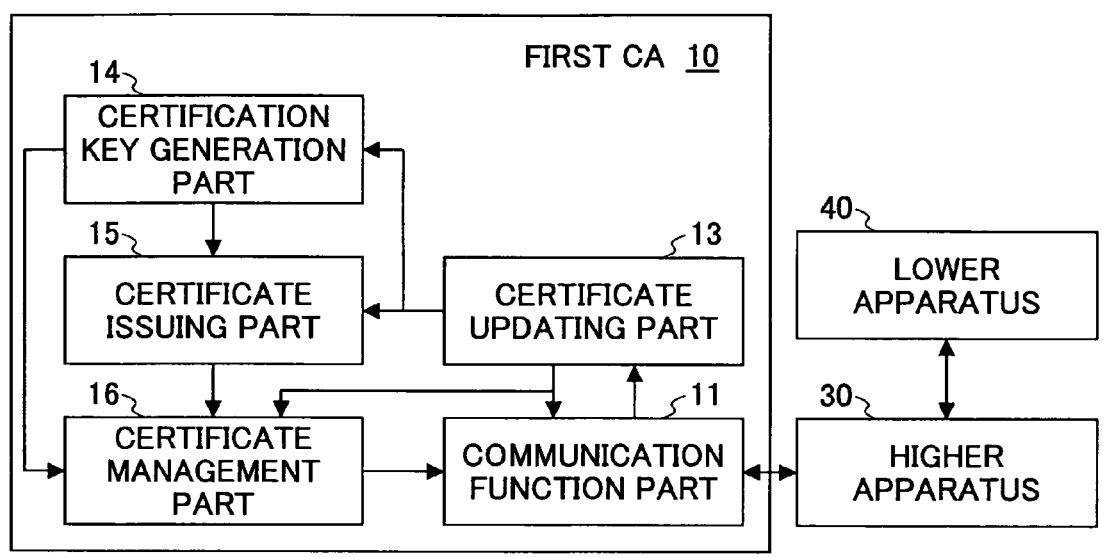
FIG. 6 shows a functional configuration of the first CA 10 relating to features of the present invention.

FIG. 6 shows a functional configuration of the first CA 10 relating to features of the present invention. As shown in the figure, the first CA 10 includes a communication function part 11, a certificate update part 13, a certification key generation part 14, a certificate issuing part 15 and a certificate management part 16.

The communication function part 11 communicates with the higher apparatus 30, receives an issuing request of a certificate set, sends an issued certificate set, and causes each part of the first CA 10 to operate according to a received request or data, and returns a response to a request source.

When the SSL is used for communicating with the higher apparatus 30, the communication function part 11 may include functions of the HTTPS server function part and the HTTPS client function part. In this case, an authentication process part is provided like the higher apparatus 30 or the lower apparatus 40 to perform an authentication process by using a proper certificate.

When receiving a certificate issuing request from the higher apparatus 30, the certificate update part 13 causes the certification key generation part 14 and the certificate issuing part 15 to issue a new certificate set for a subject lower apparatus 40, and causes the certificate management part 16 and the communication function part 11 to send the certificate set to the higher apparatus 30.

The certification key generation part 14 generates a root private key and a root key, wherein the root private key is a private key used for generating a digital signature, and the root key is used for verifying the digital certificate and is a public key (certification key) corresponding to the root private key.

The certificate issuing part 15 issues, to each of the higher apparatus 30 and the lower apparatus 40, a public key and a private key corresponding to the public key used for an authentication process in the SSL. In addition, the certificate issuing part 15 adds a digital signature to the public key by using the root private key generated by the certification key generation part 14 so as to issue a public key certificate that is a digital certificate. In addition, the certificate issuing part 15 issues a root key certificate formed by adding a digital signature to the root key.

The certificate management part 16 manages a digital certificate issued by the certificate issuing part 15, a root private key used for the generation, and a root key corresponding to the root private key. The certificate management part 16 stores the certificate and the key with a term of validity, a issuing destination, an ID and information of updated/not-updated and the like. The functions of each part are realized by executing control programs in the first CA 10.

Figure 7A:
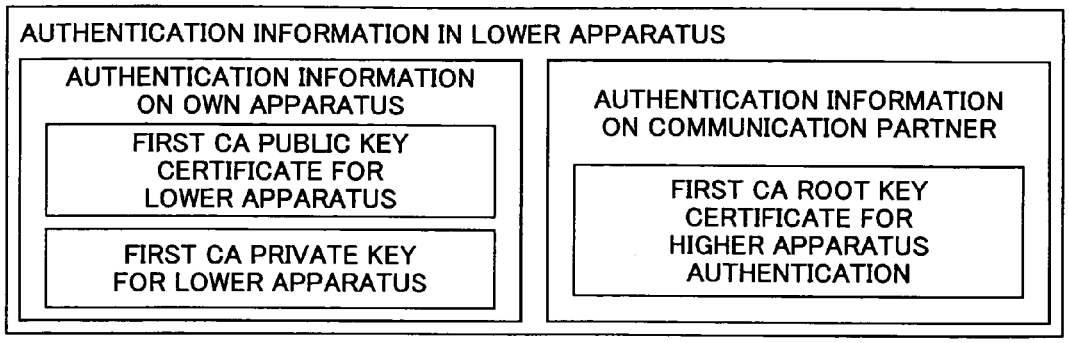
FIGS. 7A and 7B are figures for explaining authentication information stored in the higher apparatus and the lower apparatus.
Figure 7B:
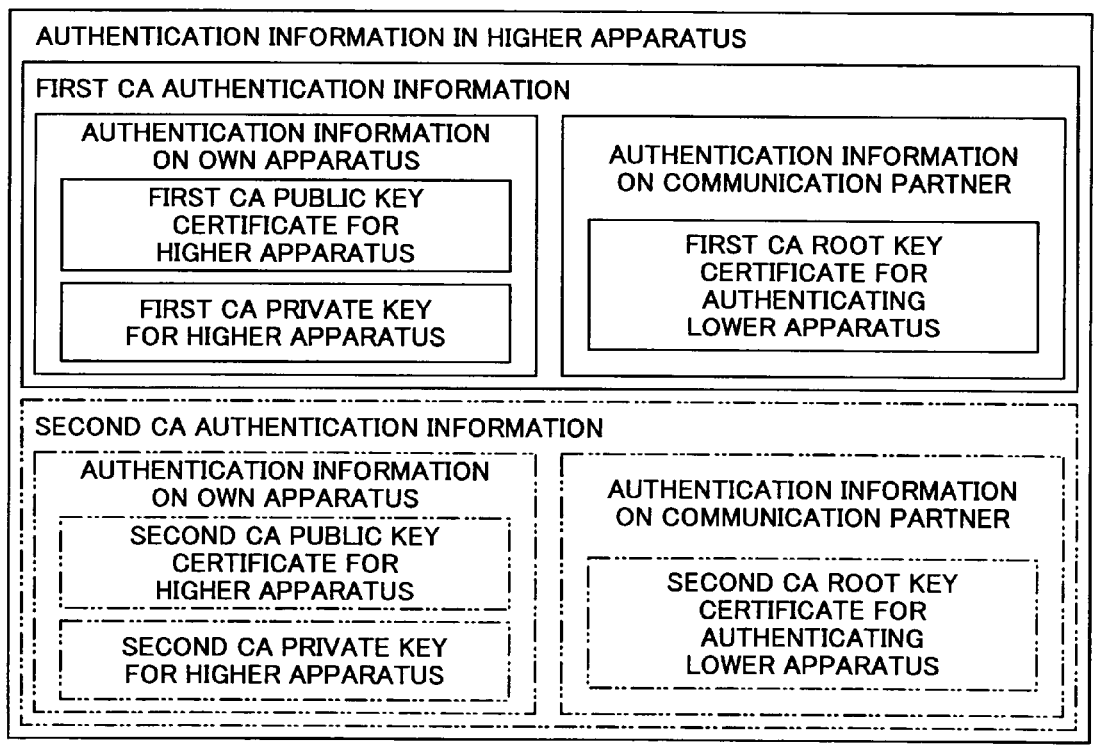

Next, characteristics and uses of each certificate and each key are described. FIG. 7A shows kinds of certificates and keys stored in the certificate storing part 45 in the lower apparatus 40. FIG. 7B shows kinds of certificates and keys stored in the certificate storing part 35 in the higher apparatus 30.

As shown in the figure, each of the higher apparatus 40 and the lower apparatus 40 stores a public key certificate and a private key as authentication information relating to the own apparatus, and stores a root key certificate that is authentication information relating to a communication partner.

Each apparatus performs authentication processes shown in FIG. 1 by using the authentication information under normal conditions.

It can be considered to perform authentication processes in which a step of sending the encrypted first random number and the public key certificate B to the communication apparatus A is omitted. This case can be shown in FIG. 8. Compared with the processes shown in FIG. 1, steps S21 and S22 in the communication apparatus B and steps S12 and S13 in the communication apparatus A (apparatus functions as a client) are omitted. In this case, the communication apparatus A cannot authenticate the communication apparatus B (apparatus functioning as a server). But, this is not a problem if only the communication apparatus B authenticates the communication apparatus A. In this case, the communication apparatus A does not need to store the root key certificate. But, since the public key B and the private key B are used for safely sending the seed of the common key from the communication apparatus A to the communication apparatus B, these keys need to be stored in the communication apparatus B although they are not used for authentication.

In certificates and keys shown in FIGS. 7A and 7B, certificates and keys having a name starting "first CA" are issued by the first CA 10. For example, the first CA public key certificate for lower apparatus is a digital certificate formed by adding a digital signature to a public key issued for the lower apparatus 40 by the first CA, wherein the digital signature can be verified by using the first CA root key.

FIG. 9 shows an example of a format of the public key certificate. As shown in FIG. 9, the public key certificate includes a public key, an issuer of the certificate, a term of validity of the certificate, a subject to be certified (issuing destination apparatus of the certificate or a user) and the like. More particularly, the certificate can be generated according to a format called X.509. FIG. 10 shows an example of a public key certificate generated according to the format.

In this example, "A" indicates identifying information of a CA, and "C" indicates identifying information of an apparatus to which the certificate is issued. The identifying information includes an address, a name, a machine number, an ID or code and the like. As to the apparatus to which the certificate is issued, it is not mandatory to include identification information for identifying each apparatus such as an ID. "B" indicates the term of validity. The term of validity is represented using a start date and time, and an end date and time.

The first CA private key for lower apparatus is a private key corresponding to the first CA public key. The first CA key certificate for authenticating the lower apparatus is a digital certificate formed by adding a digital signature to the first CA root key for authenticating the lower apparatus by using a root private key corresponding to the root key, wherein digital signature can be verified by the root key.

If a plurality of lower apparatuses 40 are provided, a same root private key is used for adding a digital signature to the first CA public key for each lower apparatus, so that the first CA root key certificate is common to the lower apparatuses 40. But, the first CA public key included in the first CA public key certificate and the corresponding private key vary for each apparatus.

Same relationships apply to the first CA public key certificate for higher apparatus, the first CA private key for higher apparatus and a first CA root key certificate for authenticating higher apparatus.

For example, in a case when the higher apparatus 30 and the lower apparatus 40 perform mutual authentication, in response to receiving a communication request from the lower apparatus 40, the higher apparatus 30 sends a first random number and the first CA public key certificate for higher apparatus to the lower apparatus 40 in which the first random number is encrypted by the first CA private key for higher apparatus. The lower apparatus 40 first checks validity of the first CA public key certificate for higher apparatus by using the first CA root key certificate for authenticating the higher apparatus. In the checking, the lower apparatus 40 checks whether the certificate has been failed or tampered with. After the certificate is verified, the lower apparatus 40 decrypts the first random number by using the public key included in the certificate. If the decryption succeeds, the lower apparatus 40 can recognize that the higher apparatus 30 is surely a issuing destination of the first CA public key certificate for higher apparatus, and the lower apparatus can identify the apparatus from identifying information included in the certificate. Then, the lower apparatus 40 can determine failure or success of authentication according to whether the identified apparatus is appropriate as a communication partner.

When authentication is successful in the lower apparatus 40, the higher apparatus 30 receives the first CA public key certificate for lower apparatus, and a random number encrypted with the first CA private key for lower apparatus, and performs authentication by using a stored first CA root key certificate for authenticating lower apparatus.

This procedure corresponds to one in a case where the HTTPS client function part 41 in the lower apparatus 40 sends a communication request to the HTTPS server function part 32 of the higher apparatus 30. In a case where the HTTPS client function part 31 of the higher apparatus 30 sends a communication request to the HTTPS server function part 42 of the lower apparatus 40, processes of the lower apparatus 30 and the lower apparatus 40 are reversed although used certificates and the keys are the same.

As explained before, a key length or a format of a public key may be changed due to advance of technologies. For example, a public key certificate having a key length of 2048 bits shown in FIG. 11 may be used instead of a public key certificate having a key length of 1024 bits shown in FIG. 10. When such change is performed, the CA (first CA 10) that are used so far cannot issue a new public key certificate corresponding to the change.

Thus, a new CA (second CA 20) is provided as indicated by dotted lines in FIG. 3. Then, the second CA 20 issues a certificate set including a new form public key certificate. After that, the certificate set issued by the second CA 20 is distributed to each apparatus so that the authentication process between the higher apparatus 30 and then lower apparatus 40 is replaced by an authentication process by using the certificate set issued by the second CA 20.

Other than certificates and keys included in the certificate set to be issued, a hardware configuration and a functional configuration of the second CA 20 are the same as those of first CA 10.

When performing an authentication process according to the SSL protocol, since a server cannot know a state of a client at the time when the client accesses a URL. (Uniform Resource Locator) of the server, the server always returns a same public key certificate when the specific URL is accessed. Therefore, basically, a configuration cannot be adopted in which an apparatus has a plurality of public key certificates, selects a public key certificate appropriate for a communication partner and sends the certificate to the communication partner.

Therefore, if the higher apparatus 30 includes both of first CA authentication information and second CA authentication information, it is necessary to select one.

In the following, a configuration to enable the selection is described with reference to FIG. 12. Although FIG. 12 shows only a case where the lower apparatus 40 sends a communication request to the higher apparatus 30, a same procedure can be used for a case where the higher apparatus 30 sends a communication request to the lower apparatus 40 in which the lower apparatus 40 includes a plurality of public key certificates.

As mentioned above, basically, a server only returns a specific public key certificate to a client that sends a communication request. However, if the server includes different URLs, it is possible to return different public key certificates for each URL.

Figure 12:
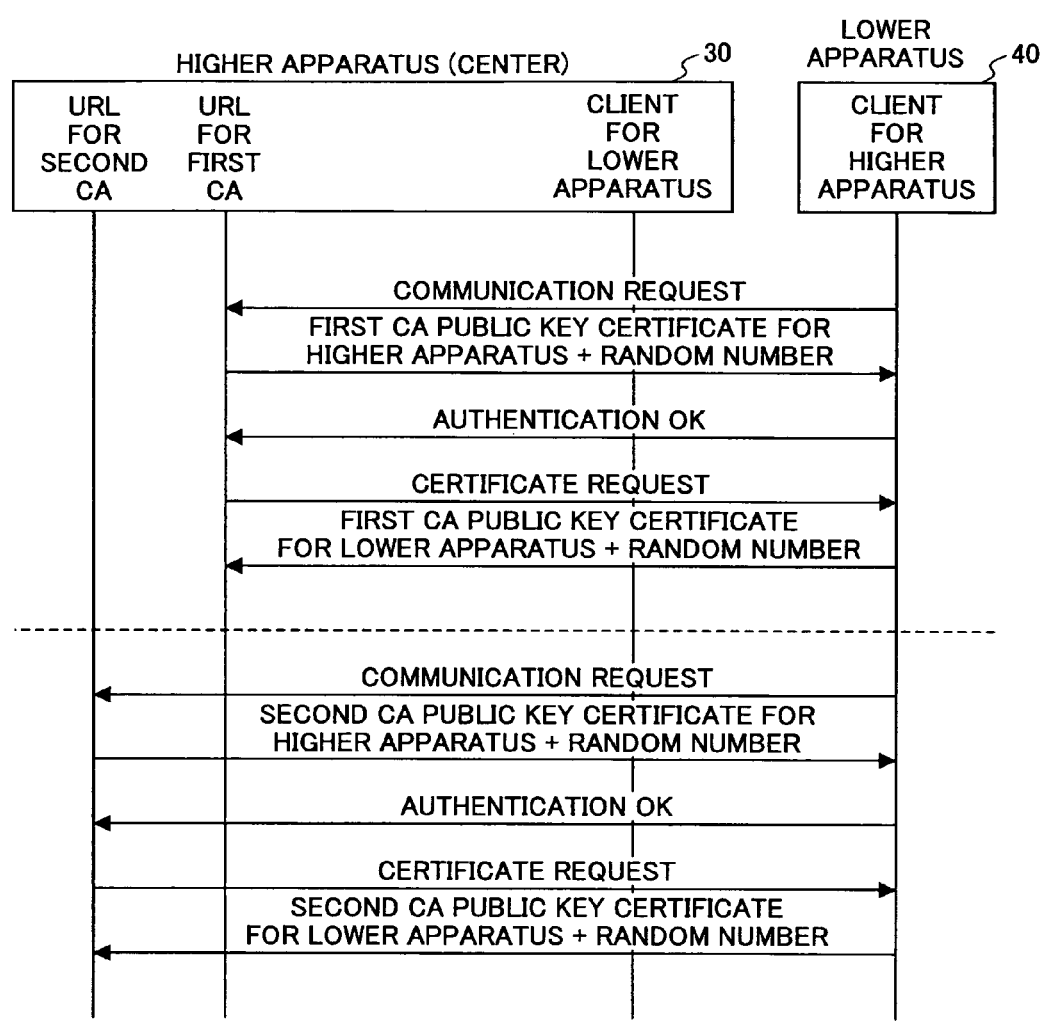
FIG. 12 is a figure for explaining a configuration for selecting a first CA public key certificate or a second CA public key certificate in the higher apparatus.

Thus, in this embodiment, as shown in FIG. 12, the higher apparatus 30 includes a first CA URL and a second CA URL, in which the first CA URL is used for authentication using the first CA public key certificate issued by the first CA 10, and the second CA URL is used for authentication using the second CA public key certificate issued by the second CA 20. The lower apparatus 40 selects a URL according to a kind of authentication and sends a communication request to the URL.

When the SSL is used as a communication protocol between the higher apparatus 30 and the lower apparatus 40, a used port is predetermined to be "443". Thus, it is necessary to change IP addresses between the first CA URL and the second CA URL. Therefore, the higher apparatus 30 is configured as an apparatus including a plurality of parts each of which a different IP address can be assigned. The plurality of parts may be divided to a plurality of bodies or may be included in a body.

In this case, the higher apparatus 30 that receives a communication request identifies a URL to which the communication request is received. When the communication request is received by the first CA URL, the higher apparatus 30 returns a first CA public key certificate. When the communication request is received by the second CA URL, the higher apparatus 30 returns a second CA public key certificate.

The lower apparatus 40 records the URL to which the communication request was sent. Thus, even if the lower apparatus 40 stores both of the first CA public key certificate and the second CA public key certificate, the lower apparatus 40 can select a proper public key certificate corresponding to the URL.

When the lower apparatus 40 needs to perform authentication by using the second CA public key certificate, it is necessary to have the second CA URL. Thus, the certificate transferring system is configured such that the higher apparatus 30 can transfer a certificate set issued by the second CA 20 shown in FIG. 13 and the second CA URL to the lower apparatus 40.

At this time, an ID may be provided to a certificate set issued by the second CA 20, and the second CA URL may be provided with information indicating a corresponding ID, so that they are associated with each other. As a result, an apparatus that receives the certificate set and the URL can identify relationship of the certificate set and the URL. In this procedure, it is not mandatory to send the certificate set together with the URL.

When a protocol that can designate a port number is used for communications between the higher apparatus 30 and the lower apparatus 40, a same IP address may be assigned to the first CA URL and the second CA URL, and different port numbers may be assigned to the first CA URL and the second CA URL. In this case, since only one IP address is necessary for the higher apparatus 30, it is not necessary to provide a plurality of parts corresponding to each IP address.

In the following, a procedure is described in which authentication information of the lower apparatus 40 is updated from one issued by the first CA 10 to one issued by the second CA 20 in detail. The procedure is for a case when a key length or a format of a public key certificate is changed, in other words, the procedure is for a case when a public key certificate is newly set so that authentication cannot be provided in a previous communication destination. This case is different from a case when a new public key certificate by which authentication can be performed in the same communication destination is provided, for example, when a public key certificate is replaced by a new one having a new term of validity. In this case, the certificate can be updated by using a conventional technology.

Figure 14:
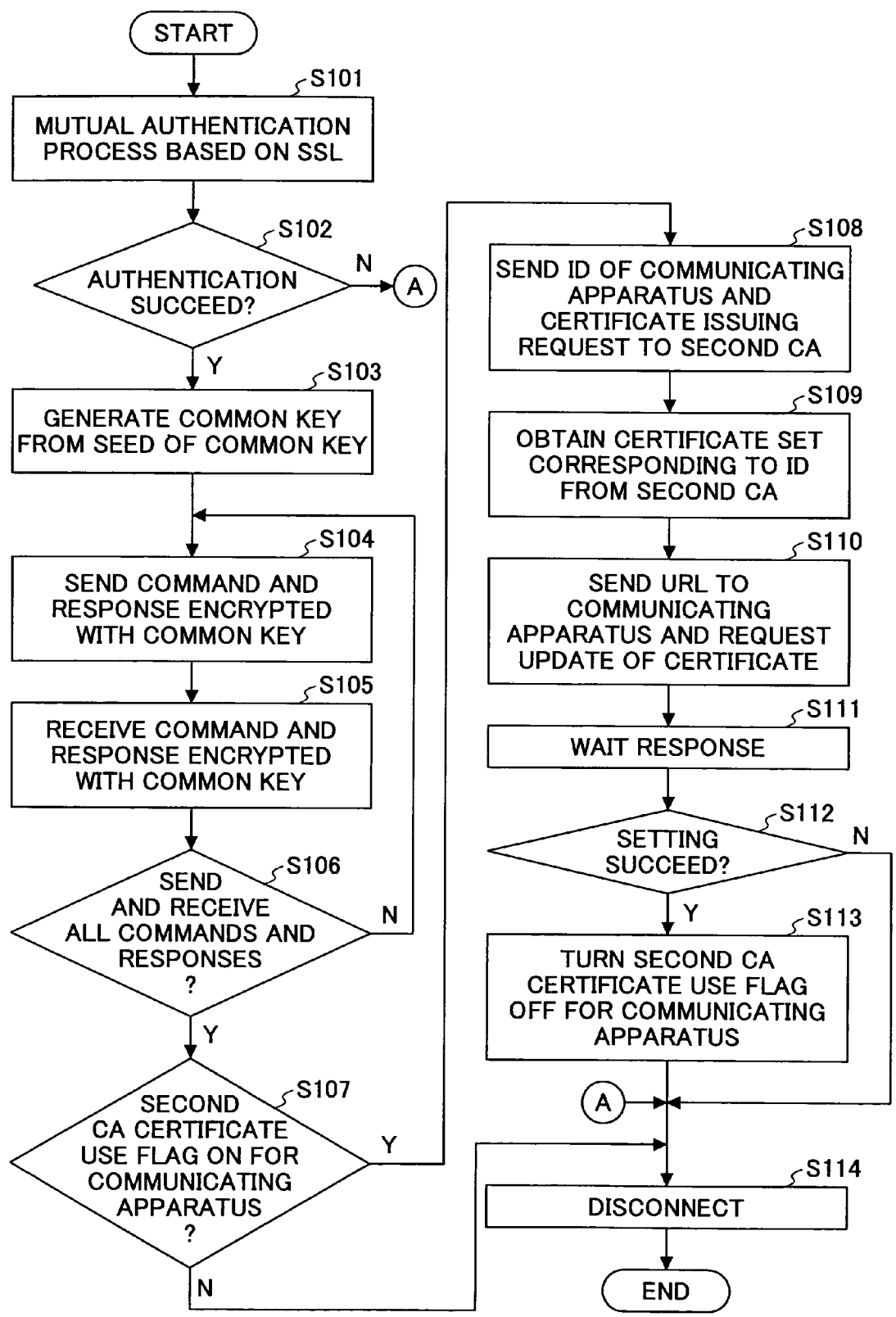
FIG. 14 shows a procedure performed by the higher apparatus 30 when the higher apparatus 30 receives a communication request at the first CA URL in which the higher apparatus 30 is in a state in which the higher apparatus 30 can perform an authentication process using the second CA public key certificate.

FIG. 14 shows a procedure performed by the higher apparatus 30 when the higher apparatus 30 receives a communication request at the first CA URL in which the higher apparatus 30 has entered a state in which it can perform an authentication process using the second CA public key certificate.

In the procedure, the second CA 20 and the second CA URL are provided. In addition, as shown by dotted lines shown in FIG. 7B, a certificate set issued by the second CA 20 is stored in the higher apparatus 30, so that the higher apparatus 30 can perform the authentication process by using the second CA public key certificate, but steps S101-106 and 114 are performed regardless of existence of the second CA 20.

In the digital certificate transferring system shown in FIG. 3, when the higher apparatus 30 receives a communication request at the first CA URL from the lower apparatus 40, the higher apparatus 30 starts the procedure shown in FIG. 14.

In step S101, the higher apparatus 30 sends and receives the first CA public key certificate, random numbers and the seed of the common key with the lower apparatus 40, so that the higher apparatus 30 performs mutual authentication with the lower apparatus 40 based on the SSL like the procedure shown in FIG. 1. This step includes a process of obtaining identifying information of the request source apparatus (lower apparatus 40) from the received public key certificate.

In step S102, the higher apparatus 30 determines whether the authentication succeeds. If the authentication is failed, the process goes to step S114 and the communication ends, and the procedure ends. If the authentication succeeds in step S102, a communication channel is established between the higher apparatus 30 and the lower apparatus 40. Then, in step S103, the higher apparatus 30 generates a common key by using the seed exchanged in step S101.

In step S104, the higher apparatus 30 encrypts a command and a response for a received command with the common key, and sends the encrypted data to the lower apparatus 40. In step S105, the higher apparatus 30 receives a command and a response for a sent command that are encrypted with the common key from the lower apparatus 40. In step S106, the higher apparatus 30 determines whether all of commands and responses are sent and received. If commands or responses to be sent or receives remain, the process goes to step S104, and the above-mentioned procedure is repeated. If all of commands and responses are sent and received, the process goes to step S107.

An order of the steps S104 and S105 may be reversed, and the step S104 or the S105 may be omitted if any command or response does not exist. In addition, a process for generating a response by executing a received command, or a process corresponding to a received command is performed separately from the flowchart shown in FIG. 14.

In a next step S107, the higher apparatus 30 determines whether a second CA certificate use flag for the lower apparatus 40 is ON.

As shown in FIG. 15, the second CA certificate use flags are stored in the higher apparatus 30, in which each flag is associated with a corresponding ID (identifying information) of a lower apparatus. "ON" indicates that the higher apparatus 30 needs to send a certificate set issued by the second CA 20 to an apparatus corresponding to the flag. The setting of the flag can be made manually by an operator of the higher apparatus 30, or the higher apparatus 30 may automatically set the flag when the higher apparatus 30 is provided with a function for performing an authentication process by using the second CA public key certificate.

In step S107, if the second CA certificate use flag is OFF, since it is not necessary to send the certificate set, the communication ends and the process ends at step S114.

If the second CA certificate use flag is ON in step S107, the process goes to step S108. In step S108, the higher apparatus 30 sends a certificate issuing request with the ID of the lower apparatus 40 to the second CA 20.

Then, the second CA 20 issues a certificate set for the lower apparatus 40 corresponding to the ID and sends it to the higher apparatus 30. The higher apparatus receives the certificate set from the second CA 20 in step S109.

In step S110, the higher apparatus 30 sends the certificate set obtained in step S109 and a URL (second CA URL) to the lower apparatus 40, wherein the URL is used by the lower apparatus 40 as a destination to which the lower apparatus 40 sends a communication request when a digital certificate in the certificate set is used for authentication. In addition, the higher apparatus 30 sends a certificate setting command to the lower apparatus 40 to request the lower apparatus 40 to set the certificate set as one to be used for communications with the higher apparatus 30 and to set the URL as an address used when the lower apparatus sends a communication request to the higher apparatus 30.

The certificate set and the URL may be sent as arguments of the certificate setting command. The communications for sending the above-mentioned data are performed via a safe SSL communication channel established by using a certificate set issued by the first CA 10. The certificate set and the URL may be sent at separate timings, and the certificate setting command may be sent at a time when both of the certificate set and the URL are sent.

After the step S110 completes, the higher apparatus 30 waits for a response for the certificate setting command in step S111. Then, in step S112, the higher apparatus 30 determines whether setting of the certificate set and the URL is successfully done in the lower apparatus 40. If it is successfully done, the higher apparatus turns the second CA certificate use flag corresponding to the lower apparatus 40 OFF, which indicates that transferring the second CA certificate set is no more necessary for the lower apparatus 40, in step S113. Then, in step S114, the communication channel is disconnected and the process ends.

If the setting is not successfully done in step S112 (including a case there is no response within a predetermined time), the communication channel is disconnected and the process ends in step S114. In this case, if the same lower apparatus sends a communication request to the first CA URL next time, the higher apparatus 30 again tries to send the second CA certificate set and the like.

According to the above-mentioned processes, the certificate set issued by the second CA 20 and the URL can be sent to the lower apparatus 40 via a safe communication channel, and the higher apparatus 30 can request the lower apparatus 40 to set the certificate set and the URL as mentioned above.

Figure 16:
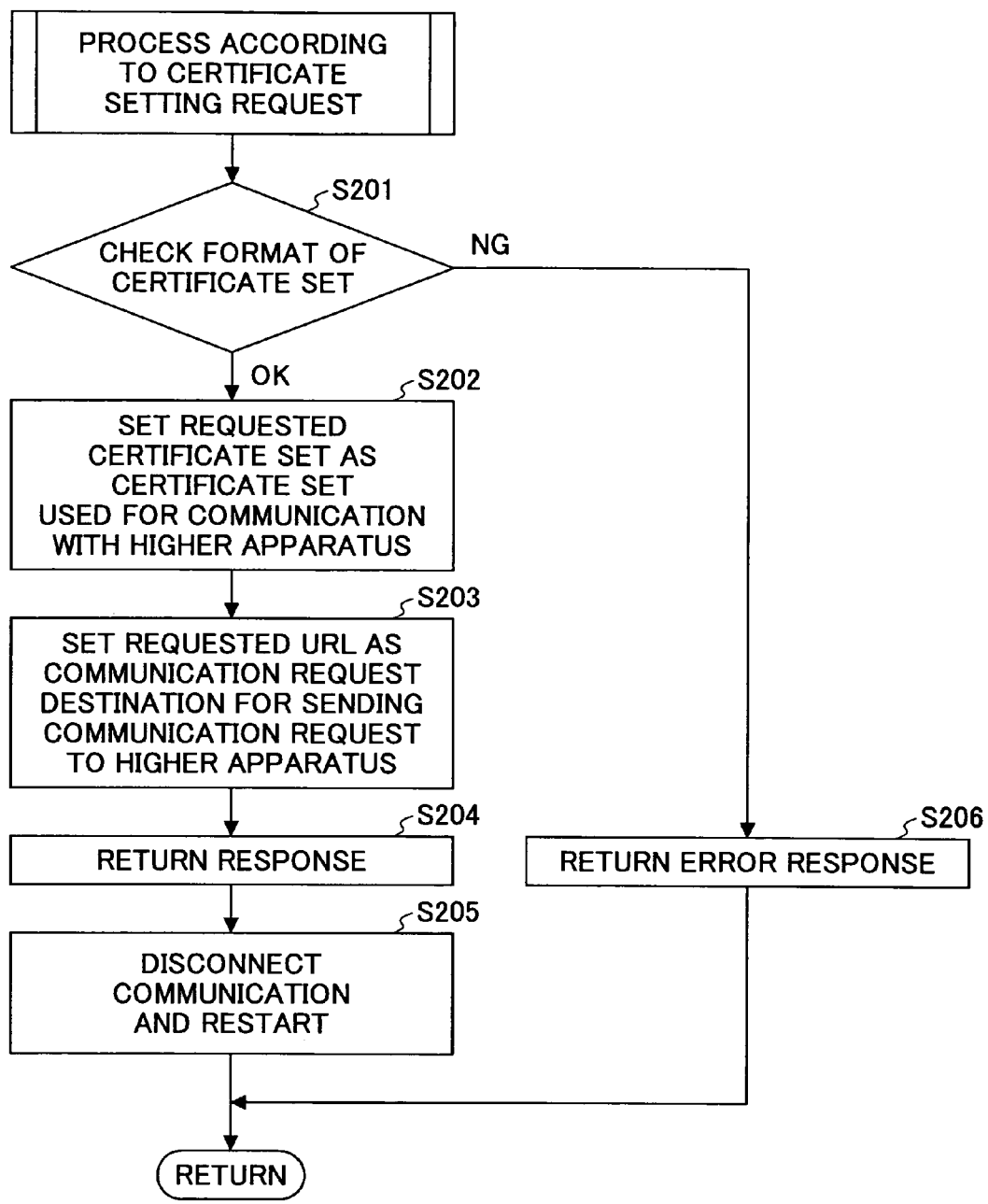
FIG. 16 shows a procedure executed by the lower apparatus 40 that receives the certificate setting command from the higher apparatus 30.

FIG. 16 shows a procedure executed by the lower apparatus 40 that receives the certificate setting command from the higher apparatus 30.

When the lower apparatus 40 receives the certificate setting command from the higher apparatus 30, the procedure of FIG. 16 starts. First, in step S201, the lower apparatus 40 checks a format of the certificate set indicated by the certificate setting command. If the format is not appropriate (NG), the lower apparatus 40 returns an error response in step S206 to notify the higher apparatus 30 of failure of setting of the certificate set and the URL in step S206, then, the process ends.

If the format is appropriate (OK) in step S201, the lower apparatus 40 sets the certificate set indicated by the certificate setting command as a certificate set used for communications with the higher apparatus 30 in step S202. Then, in step S203, the lower apparatus 40 sets the URL indicated by the certificate setting command as a communication request destination used for communications using the new certificate set.

Then, the lower apparatus 40 returns a response for the certificate setting command to the higher apparatus 30 in step S204. In step S204, the communication channel is disconnected and the lower apparatus 40 restarts itself. The restart is necessary for changing important settings such as the setting of the certificate set and the URL in the lower apparatus 40. Before the lower apparatus 40 restarts, the lower apparatus 40 may request a permission of a user. Although FIG. 16 shows that the process returns to an original process after the step S205, the process is once interrupted at the time of the restart in step S205.

In the procedure shown in FIG. 14, steps S107-S113 relating to certificate transfer are performed after the steps S104-S106 relating to sending/receiving of commands and responses. Therefore, even when the certificate is set and the restart is performed so that the communication is disconnected, sending/receiving of commands and responses can be performed.

According to the above-mentioned processes, the lower apparatus 40 can store the certificate set and the URL that are associated with each other as data used for communication with the higher apparatus 30 after that. When the setting of the certificate set and the URL is successfully done, after the lower apparatus 30 is restarted, the lower apparatus 40 sends a communication request to the second CA URL for communicating with the higher apparatus 30, and sends a second CA public key certificate for lower apparatus to the higher apparatus 30 in an authentication process.

In the steps S202 and 203, the certificate set and the URL are stored in the certificate storing part 45. When the certificate set and the URL are received separately from the certificate setting command, the received certificate set and the URL are temporarily stored in a storing area. Then, at the time when the certificate setting command is received, the process shown in FIG. 16 starts so that the certificate sent and the URL are set.

For performing the above-mentioned mutual authentication in a system such as an remote management system for electronic apparatuses in which operations are automatically performed, a communication request destination, a digital certificate and keys used for authentication processes need to be automatically selected.

If two kinds of certificates and keys exist for one purpose, the apparatus needs to perform a process for selecting a proper destination and a proper certificate, so that process load and application development load may increase. Therefore, it is required that there exists only one kind of certificate, key and destination for one purpose (for example, a purpose of "remote management" for a remote management system.

In a management apparatus side of the remote management system, when verifying a received public key certificate by using a root key certificate, the management apparatus may inquire of a CA that issued the public key certificate whether the public key certificate is valid or whether there remains a record indicating the public key certificate was issued.

In this case, if different public key certificates are sent from one apparatus, the destination for sending the above-mentioned inquiry should be managed in addition to manage subject apparatuses. In contrast, if only one kind of public key certificate is sent from one apparatus, the public key certificate sent from an apparatus can be verified by inquiring of a specific CA that issued the public key certificate, so that the process of inquiring can be simplified.

For the reasons mentioned above, it has been required that the management apparatus stores only one kind of the certificate, key and a communication destination for one purpose.

Even when an operator can select a certificate, there is the same requirement from the viewpoint of avoiding selecting processes and decreasing application development load.

To satisfy this requirement, the lower apparatus 40 includes only one certificate set used for communicating with the higher apparatus 30. Therefore, when a new certificate set and a new URL are set, a previous certificate set and a previous URL are overwritten.

Figure 17:
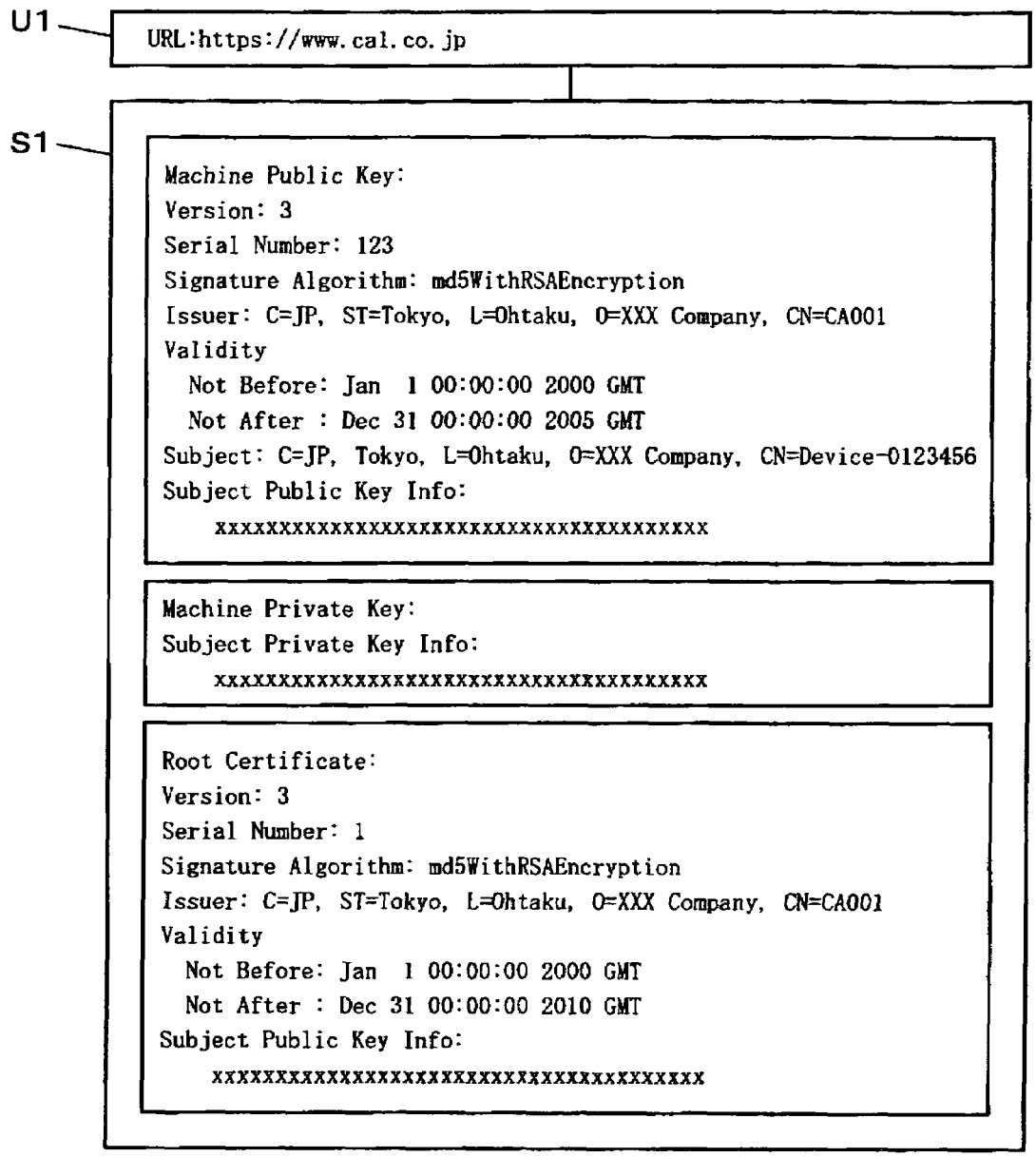
FIG. 17 shows an example of a public key certificate issued by a first CA and a communication destination to which the lower apparatus communicate with by using the public key certificate, wherein the public key certificate and the communication destination is stored in a certificate storing part in the lower apparatus.
Figure 18:
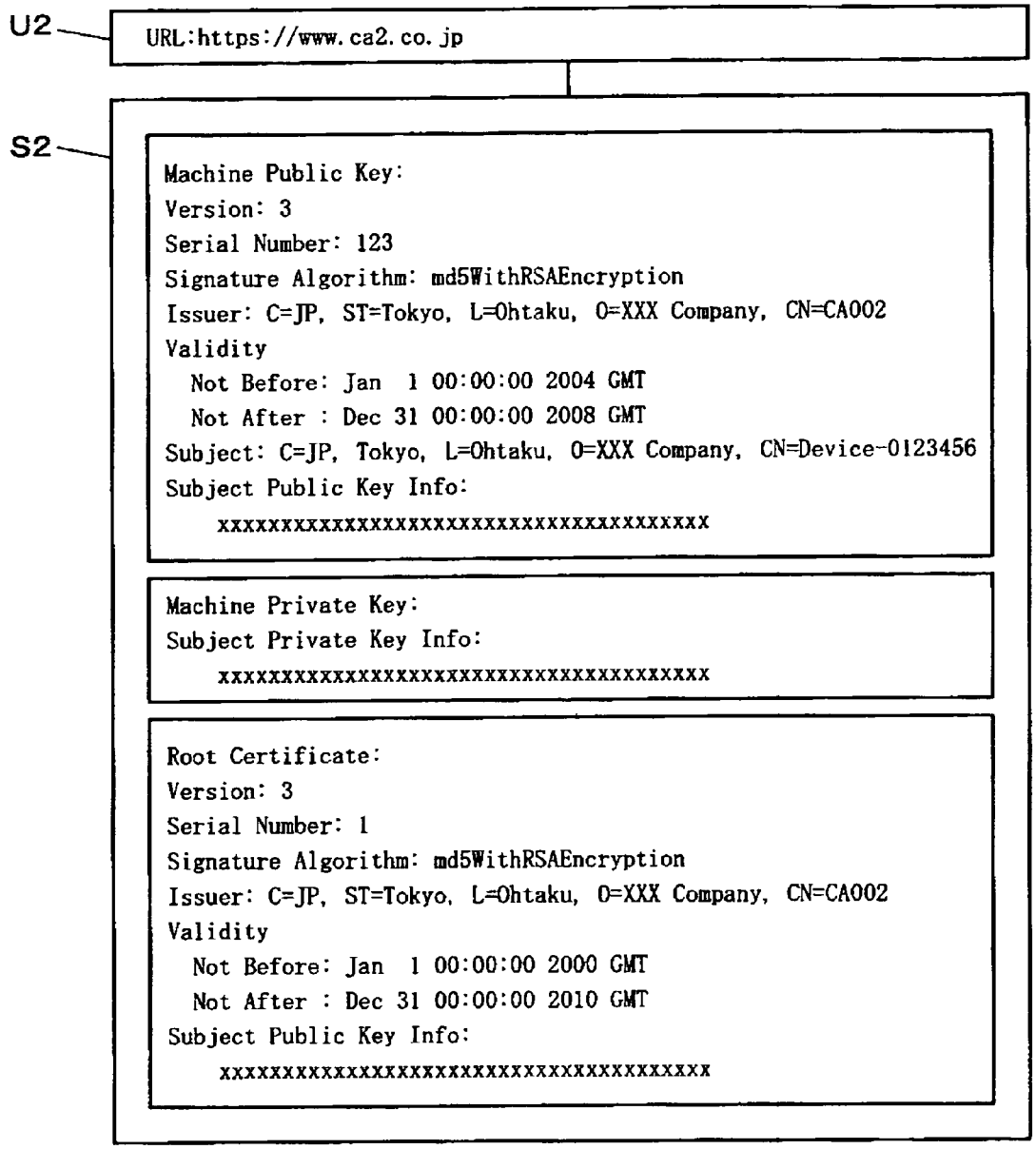
FIG. 18 shows an example of a public key certificate issued by a second CA and a communication destination to which the lower apparatus communicate with by using the public key certificate, wherein the public key certificate and the communication destination is stored in the certificate storing part in the lower apparatus.

For example, as shown in FIG. 17, it is assumed that the certificate storing part stores a certificate set S1 issued by the first CA 10 as a certificate set used for communicating with the higher apparatus 30, and a CA1 URL "https://www.ca1.co.jp" as a communication destination U1. In this case, when steps S202 and S203 are performed, the certificate set S1 is overwritten with a certificate set S2 issued by the second CA 20, and the communication destination U1 is overwritten with a CA2 URL "https://www.ca2.co.jp" as shown in FIG. 18. Even though the update is performed by overwriting, a state in which communication with the higher apparatus 30 can be performed is kept before and after the update.

A storing area for storing the certificate set is not necessarily adjacent to a storing area for storing the URL as long as correspondence between the certification set and the URL can be kept.

When the areas for storing the received certificate set and the URL temporarily are provided, a process load of the lower apparatus 40 becomes large. Thus, the areas may not be provided.

In this case, if only the certificate set issued by the second CA 20 is received first, only the certificate set is overwritten. Then, in this case, since the communication destination is not changed, there is a possibility that an authentication process may be requested to the first CA URL by using the certificate set issued by the second CA 20.

Thus, in this case, the first CA public key certificate is not verified by using the second CA root key certificate, and the second CA public key certificate is not verified by using the first CA root key certificate, so that the authentication process fails. Thus, in this case, a safe communication channel cannot be established between the higher apparatus 390 and the lower apparatus 40. If the apparatuses are set such that communications should be performed by using the SSL, any communication cannot be performed.

Therefore, the second CA URL cannot be sent from the higher apparatus 30 to the lower apparatus 40, and it becomes necessary to send the second CA URL to a user of the lower apparatus 40 via another route such as a postal mail, so that large activity load occurs for enabling communications between the higher apparatus 30 and the lower apparatus 40 again.

This situation also occurs in a case when only the second CA URL is received first.

If the higher apparatus 30 transfers the certificate update command together with the certificate set and the communication destination address to the lower apparatus 40, the lower apparatus 40 receives them at a time so that update can be performed at a time. Thus, in this case, even if the lower apparatus 40 has only one kind of a certificate set and a URL and if the areas temporarily storing the certificate set and the URL are not provided, the above-mentioned problem does not occur, so that the certificate set can be updated by using a safe communication channel while keeping a state in which communications with the higher apparatus 30 is available.

Figure 21:
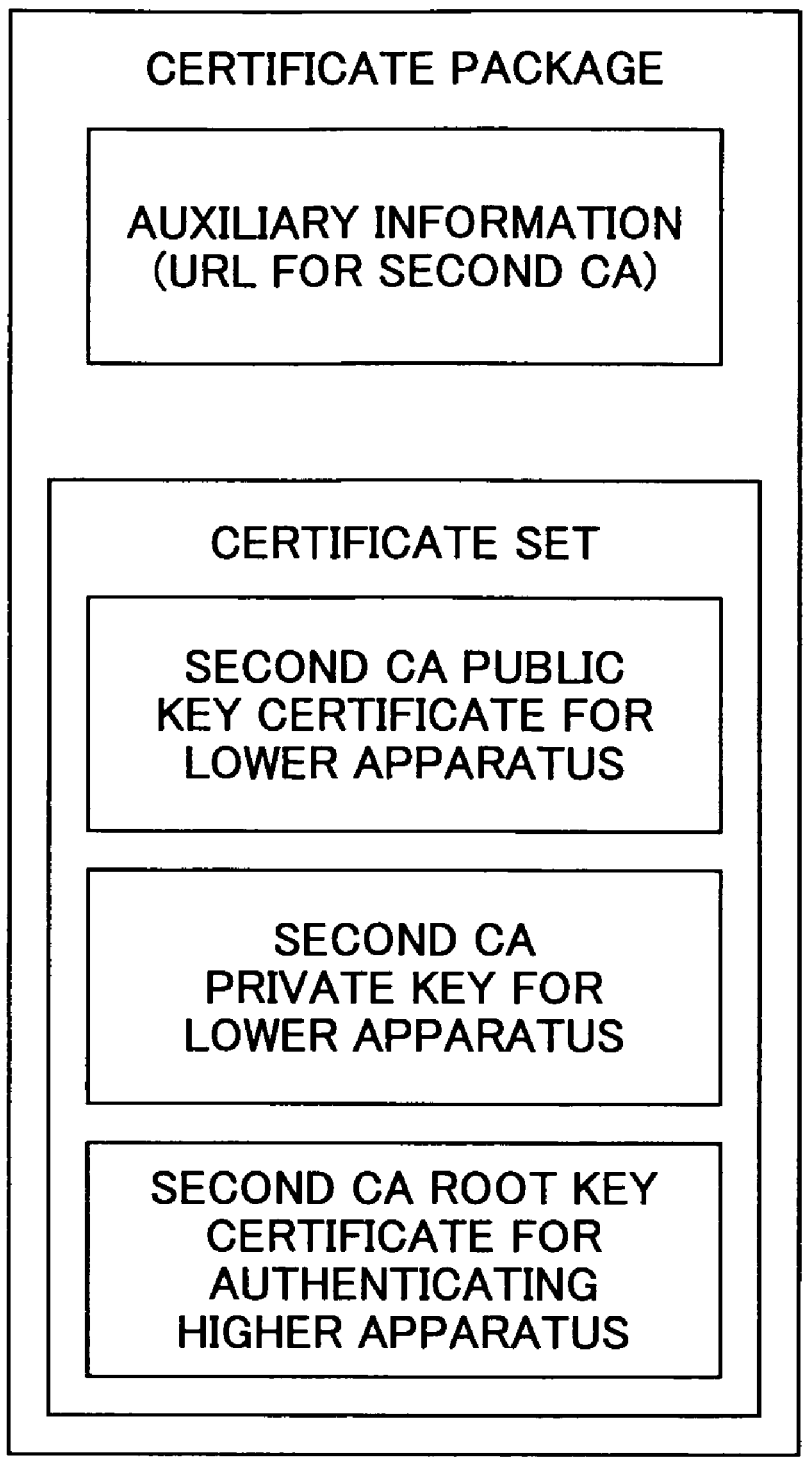
FIG. 21 shows an example of a certificate package in a case when a second CA certificate set is transferred together with a second CA URL.

In a case when transferring the second CA certificate set together with the second CA URL, it can be considered that they are included in a certificate package as shown in FIG. 21.

Figure 19:
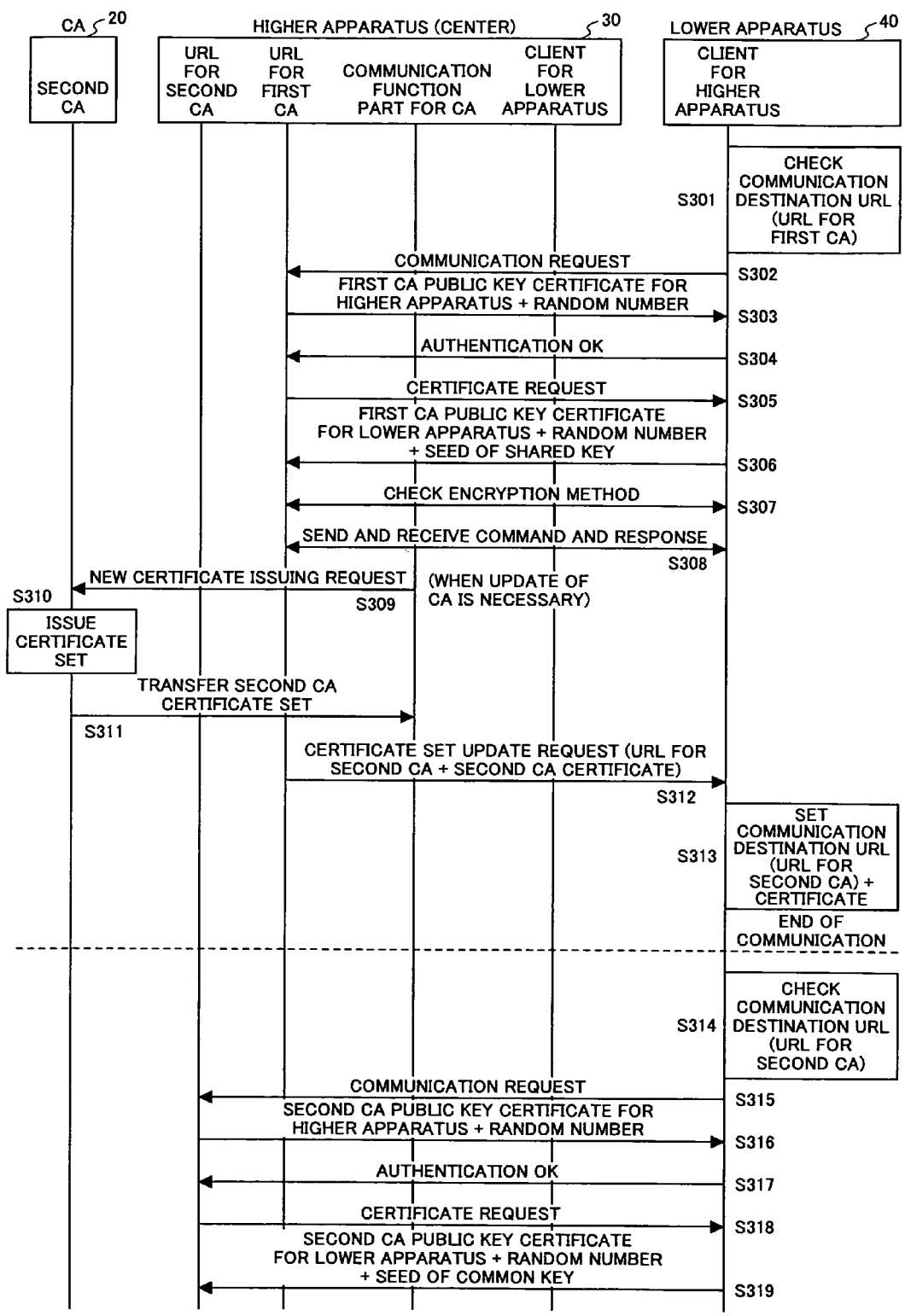
FIG. 19 shows an example or a process sequence when a CA is changed for the higher apparatus and the lower apparatus.

Next, an example of a procedure in which the higher apparatus 30 and the lower apparatus 40 perform change of a CA is described with reference to FIG. 19.

In this example, first, when the lower apparatus 40 communicates with the higher apparatus 30, the lower apparatus 40 identifies a URL to which a communication request should be sent in step S301. Then, the lower apparatus sends the communication request to the first CA URL in step S302. In this step, the HTTPS client function part 41 functions as a client for the higher apparatus 30. The HTTPS server function part 32 receives the communication request in the higher apparatus 30, and the HTTPS server function part 32 passes the request to the authentication process part 33. This means that the higher apparatus 30 is requested to perform authentication using the first CA public key certificate. The authentication process part 33 returns a first random number encrypted by the first CA private key for higher apparatus stored in the certificate storing part 35 and a first CA public key certificate for higher apparatus stored in the certificate storing part 35 to the lower apparatus 40 according to the SSL protocol in step S303.

In the lower apparatus 40, received data are passed to the authentication process part 43 so that an authentication process is performed. In this case, the received first CA public key certificate for higher apparatus is verified by using the first CA root key certificate for higher apparatus stored in the certificate storing part 45. Thus, the authentication succeeds, and the lower apparatus 40 returns a response indicating the success of authentication in step S304. In response to that, the higher apparatus 30 sends a certificate request to the lower apparatus 40 in step S305. Then, the lower apparatus 40 returns a second random number encrypted by the first CA private key for lower apparatus and the first CA public key certificate for lower apparatus to the higher apparatus. In addition, the lower apparatus sends a seed of a common key encrypted by the first CA public key for higher apparatus to the higher apparatus 30 in step S306.

The higher apparatus 30 passes the data to the authentication process part 33 so as to perform the authentication process. In this case, the received first CA public key certificate can be verified by the first CA root key certificate for authenticating lower apparatus. Thus, the authentication succeeds, and an encryption method used for communications after that is checked in step S307.

As a result, a communication channel based on the SSL is established between the higher apparatus 30 and the lower apparatus 40. After that, data are encrypted by the common key when communications between the higher apparatus 30 and the lower apparatus 40 are performed in step S308.

After that, when the higher apparatus 30 determines that it is necessary that the lower apparatus 40 needs to store a certificate set issued by the second CA 20, that is, it is necessary to update a CA issuing a certificate for the lower apparatus 40, the higher apparatus 30 communicates with the second CA 20 by using the CA communication function part 36 to send a certification issuing request and identification information of the lower apparatus 40 so as to request the second CA 20 to issue a certificate set for the lower apparatus 40 in step S309.

In response to the request, the second CA 20 issues a second CA certificate set for the lower apparatus 40 in step S310, and transfers the certificate set to the higher apparatus 30 in step S311.

When the higher apparatus 30 receives the second CA certificate set, the higher apparatus 30 transfers the second CA certificate and the second CA URL with a certificate set update command to the lower apparatus 40 in step S312.

The lower apparatus 40 sets the second CA URL as a communication destination URL and sets the second CA certificate set as a certificate set used for an authentication process used for communications in step S313. Then, update of the certificate set completes, so that the lower apparatus 40 disconnects the communication channel and restarts itself.

After the restart completes, since the second CA URL is registered in the lower apparatus 40, the lower apparatus 40 sends a communication request to the second CA URL, so that authentication processes can be performed by using a public key certificate, a private key, and a root key certificate included in the certificate set issued by the second CA in steps S314-S319.

According to the above-mentioned system, the higher apparatus 30 can transfer a new public key certificate to the lower apparatus 40 for changing a key length of a public key or a format of a public key certificate while keeping availability of mutual authentication.

If there are a plurality of lower apparatuses, the higher apparatus 30 performs the procedure shown in FIG. 14 each time when the higher apparatus 30 receives a communication request at the first CA URL from a lower apparatus, so that a certificate set and communication destination information can be updated for the lower apparatuses one by one. Finally, a certificate set issued by the second CA 20 and a second CA URL are stored in every lower apparatus as shown in FIG. 20.

In this state, the higher apparatus 30 does not need to perform authentication by using the first CA public key certificate. Thus, the higher apparatus 30 needs to have only the public key certificate issued by the second CA 20. Thus, processing and a software configuration can be simplified by receiving the communication request only at the second CA URL.

According to the processes mentioned above, a safe communication channel is established using a certificate set stored in the higher apparatus 30 and the lower apparatus 40 beforehand, and the higher apparatus 30 transfers the second CA certificate set and the second CA URL to the lower apparatus 40 via the communication channel. Thus, a private key that should not be leaked to third parties can be transferred safely.

In addition, since the second CA certificate set and the second CA URL are transferred when the higher apparatus 30 verifies the lower apparatus by using the first CA public certificate for lower apparatus, the lower apparatus 40 can be verified as a destination of the second CA certificate set before transferring it.

In addition, since the higher apparatus 30 sends the second certificate set and the second CA URL when it receives the communication request at the first CA URL, the higher apparatus 30 can easily identify an apparatus that uses a certificate set to be updated. In addition, since the second CA certificate use flag is used for determining whether the second CA certificate set is to be transferred, a communication using the first CA public key certificate can be kept as to an apparatus that does not need to update the certificate.

For example, there may be a situation in which a public key that has a long key length cannot be distributed to a foreign user due to export prohibition even when a second CA 20 is provided for providing the public key certificate for the long key length. Even in this situation, by setting the second CA certificate use flag ON only for lower apparatuses used by domestic users, the higher apparatus 30 can automatically distributes the second CA public key certificate only to domestic lower apparatuses 40.

According to the present invention, since the public key certificate can be automatically updated, the present invention is especially effective for an apparatus for which an operator cannot update a certificate, such as a set-top box of a cable TV, and an image forming apparatus to be managed remotely.

Although a configuration in which the first CA 10 and the second CA 20 are separate apparatuses is described in the above-mentioned embodiment, the apparatuses may be integrated to one apparatus in which different CAs are configured by using software. In addition, the first CA 10 and the second CA may be a same CA.

In addition, the processes described above can be applied to a case where a root key certificate (and a root private key) are changed. If a root key in only one of the higher apparatus 30 and the lower apparatus 40 is updated, a public key certificate of a communication partner cannot be verified so that authentication cannot be performed. But, as mentioned above, by changing a communication destination and by sending a new certificate set and sending identifying information of the new communication destination, the new certificate set can be distributed while a state in which authentication is available is kept.

Although the higher apparatus 30 sends a certificate setting command to the lower apparatus 40 in the above-mentioned embodiment, it is not necessary to send the certificate setting command. The setting of the second CA certificate set and the second URL may be performed in the lower apparatus 40 without the command.

Further, an example using a URL as communication destination information is described in the above-mentioned embodiment, the information may not be a URL as long as the information can indicate a sending destination for the lower apparatus 40 to sent the communication request. For example, the information may be an IP address.

In the above-mentioned embodiment, when the lower apparatus 40 sends a communication request to the higher apparatus 30, the higher apparatus 30 sends the second CA certificate set and the second CA URL to the lower apparatus 40. This procedure has an advantage in that the second CA certificate set and the second CA URL can be transferred even when the lower apparatus 40 exists within an firewall. However, instead of this procedure, the higher apparatus 30 may send a communication request to the lower apparatus 40, then, send the second CA certificate set and the second CA URL to the lower apparatus 40.

In the above-mentioned embodiment, a case is described in which a program is not updated for performing an authentication process using a certificate in the second CA certificate set. However for example, if an algorithm of a digital signature is changed, a format of a certificate is largely changed or a version of a certificate is changed, there may be a case where the update of the program is necessary. In this case, the higher apparatus 30 may send the new program in addition to the second certificate set and the second CA program to the lower apparatus 40 via the safe communication channel.

Figure 8:
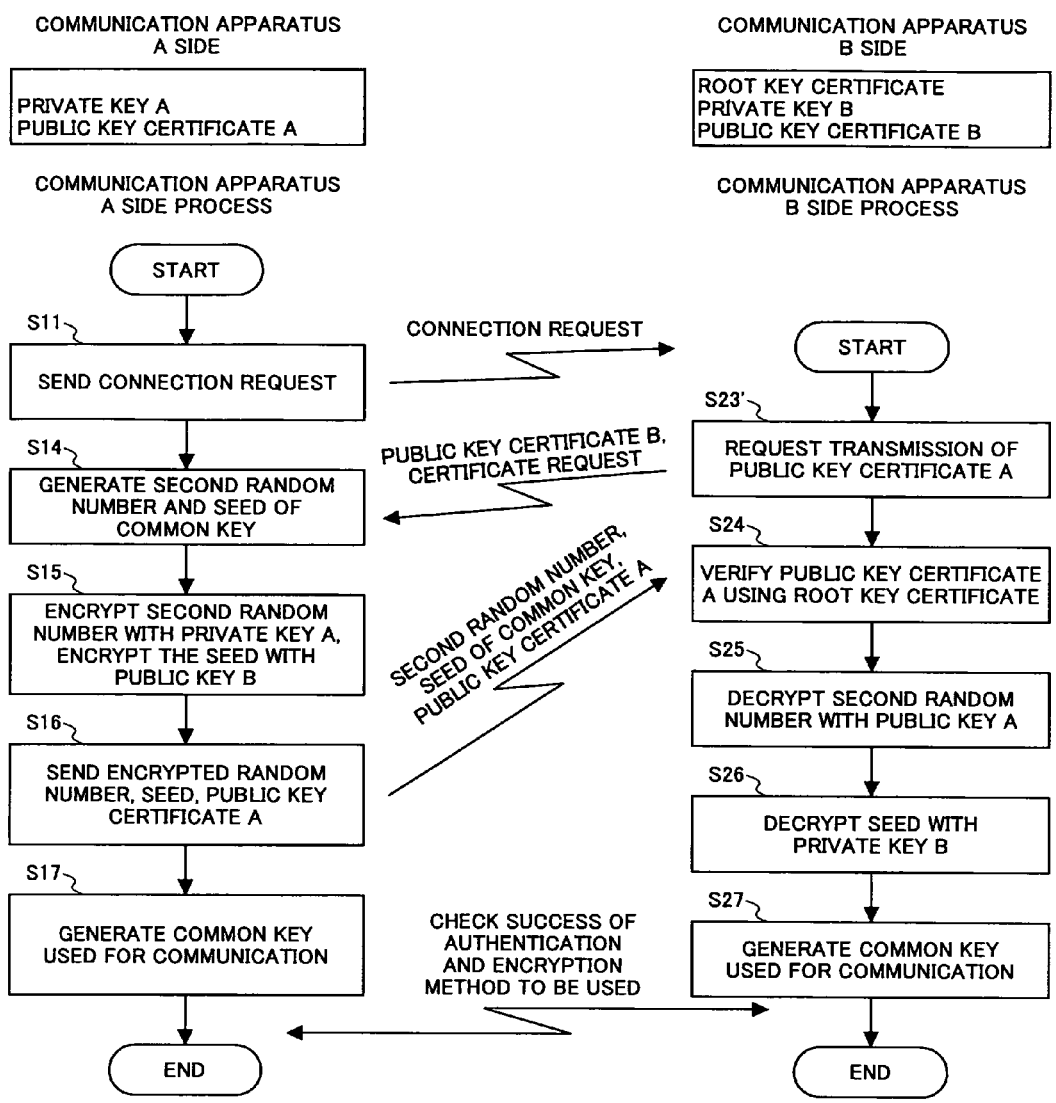
FIG. 8 shows a modified example of the FIG. 1.

In addition, although a case where the higher apparatus 30 and the lower apparatus 40 perform mutual authentication as shown in FIGS. 1 and 8 based on the SSL is described in the above-mentioned embodiment, the authentication procedure is not necessarily based on such procedure. For example, TLS (Transport Layer Security) which is modified from SSL can be also used.

In addition, the first CA 10 and the second CA 20 are not necessarily provided separately from the higher apparatus 30. They may be integrated into the higher apparatus 30. In this case, a part including a CPU, a ROM and a RAM and the like for realizing a CA may be independently provided in the higher apparatus 30. Alternatively, by providing software for a CA by using a CPU, a ROM and a RAM and the like of the higher apparatus 30, the higher apparatus 30 may function as the CA in addition to the higher apparatus 30 itself. In this case, in the higher apparatus 30, inter-process communications are performed between a process functioning as the CA and a process functioning as the higher apparatus 30.

A program of the present invention is a program for realizing a function of the higher apparatus 30 in a computer. By installing the program into a computer, the higher apparatus 30 that performs above-mentioned processes can be realized.

The program may be preinstalled in the computer in a ROM or in a storage such as a HD. Alternatively, the program may be provided as a nonvolatile recording medium such as a CD-ROM, a flexible disk, a SRAM, an EEPROM, a memory card and the like. By installing the program into the computer from the recording medium and executing the program in the computer, the above-mentioned processes can be performed. In addition, the program can be downloaded from an external apparatus that includes a storage including the program.

As mentioned above, according to the present invention, a digital certificate in a communication apparatus can be updated easily and safely, so that operations for shifting a digital certificate used in communications to a new digital certificate safely and easily.

Thus, by applying the present invention in a communication system in which authentication processes are performed by using digital certificates, a format change of a digital certificate, improvement of safety and the like can be performed easily and at low cost while maintaining safety of the communication system.

The present invention is not limited to the specifically disclosed embodiments, and variations and modifications may be made without departing from the scope of the present invention.

The present application contains subject matter related to Japanese patent application No. 2003-418677, filed in the JPO on December 16, 2003, and Japanese patent application No. 2004-336441, filed in the JPO on Nov. 19, 2004, the entire contents of which are incorporated herein by reference.

What is claimed is:

1. A digital certificate transferring method for transferring a second digital certificate from a certificate transferring apparatus to a communication apparatus storing a first digital certificate which is different from the second digital certificate, comprising:

requesting issuance of the second digital certificate and identifying information of a communication destination to be transferred to the communication apparatus; and transferring, to the communication apparatus via a safe communication channel established by using the first digital certificate, the second digital certificate and identifying information of a communication destination which the communication apparatus should access for communicating with the certificate transferring apparatus by using the second digital certificate, wherein the communication apparatus disconnects the safe communication channel upon receipt of the second digital certificate and identifying information of a communication destination.

2. The digital certificate transferring method as claimed in claim 1, wherein the certificate transferring apparatus transfers the second digital certificate together with the identifying information of the communication destination.

3. The digital certificate transferring method as claimed in claim 1, wherein a key used for verifying the first digital certificate is different from a key used for verifying the second digital certificate.

4. The digital certificate transferring method as claimed in claim 1, wherein the certificate transferring apparatus transfers the second digital certificate and the identifying information of the communication destination if the certificate transferring apparatus verifies the communication apparatus by using the first digital certificate.

5. The digital certificate transferring method as claimed in claim 1, wherein the certificate transferring apparatus transfers the second digital certificate and the identifying information of the communication destination if the certificate transferring apparatus receives a communication request from the communication apparatus and if the certificate transferring apparatus has a setting indicating the second digital certificate needs to be sent to the communication apparatus.

6. The digital certificate transferring method as claimed in claim 1, wherein the certificate transferring apparatus requests the communication apparatus to set the second digital certificate and the identifying information of the communication destination in the communication apparatus when the certificate transferring apparatus sends the second digital certificate and the identifying information to the communication apparatus.

7. A digital certificate transferring apparatus for transferring a second digital certificate to a communication apparatus storing a first digital certificate which is different from the second digital certificate, the certificate transferring apparatus comprising:

a requesting part for requesting issuance of the second digital certificate and identifying information of a communication destination to be transferred to the communication apparatus; and a part for transferring, to the communication apparatus via a safe communication channel established by using the first digital certificate, the second digital certificate and identifying information of a communication destination which the communication apparatus should access for communicating with the certificate transferring apparatus by using the second digital certificate, wherein the communication apparatus disconnects the safe communication channel upon receipt of the second digital certificate and identifying information of a communication destination.

8. The digital certificate transferring apparatus as claimed in claim 7, wherein a key used for verifying the first digital certificate is different from a key used for verifying the second digital certificate.

9. The digital certificate transferring apparatus as claimed in claim 7, the digital certificate transferring apparatus further comprising an authentication part for authenticating the communication apparatus by using a digital certificate received from the communication apparatus, wherein the part transfers the second digital certificate and the identifying information of the communication destination if the authentication part verifies the communication apparatus by using the first digital certificate.

10. The digital certificate transferring apparatus as claimed in claim 7, wherein the part transfers the second digital certificate and the identifying information of the communication destination if the certificate transferring apparatus receives a communication request from the communication apparatus and if the certificate transferring apparatus has a setting indicating the second digital certificate needs to be sent to the communication apparatus.

11. The digital certificate transferring apparatus as claimed in claim 7, wherein the part requests the communication apparatus to set the second digital certificate and the identifying information of the communication destination in the communication apparatus when the part sends the second digital certificate and the identifying information to the communication apparatus.

12. A digital certificate transferring system including a communication apparatus storing a first digital certificate and a digital certificate transferring apparatus for transferring a second digital certificate which is different from the first digital certificate to the communication apparatus, the certificate transferring apparatus comprising:

a requesting part for requesting issuance of the second digital certificate and identifying information of a communication destination to be transferred to the communication apparatus; and a certificate transferring part for transferring, to the communication apparatus via a safe communication channel established by using the first digital certificate, the second digital certificate and identifying information of a communication destination which the communication apparatus should access for communicating with the certificate transferring apparatus by using the second digital certificate, and the communication apparatus comprising:

a part for receiving the second digital certificate and the identifying information from the certificate transferring apparatus and storing the second digital certificate and the identifying information, wherein the communication apparatus disconnects the safe communication channel upon receipt of the second digital certificate and identifying information of a communication destination.

13. The digital certificate transferring system as claimed in claim 12, wherein a key used for verifying the first digital certificate is different from a key used for verifying the second digital certificate.

14. The digital certificate transferring system as claimed in claim 12, wherein the certificate transferring part transfers the second digital certificate and the identifying information of the communication destination if the certificate transferring apparatus verifies the communication apparatus by using the first digital certificate.

15. The digital certificate transferring system as claimed in claim 12, wherein the certificate transferring part transfers the second digital certificate and the identifying information of the communication destination if the certificate transferring apparatus receives a communication request from the communication apparatus and if the certificate transferring apparatus has a setting indicating that the second digital certificate needs to be sent to the communication apparatus.

16. The digital certificate transferring system as claimed in claim 12, wherein the certificate transferring apparatus requests the communication apparatus to set the second digital certificate and the identifying information of the communication destination in the communication apparatus when the certificate transferring part sends the second digital certificate and the identifying information to the communication apparatus, and the communication apparatus sets the second digital certificate and the identifying information as information used for communicating with the digital certificate transferring apparatus.

17. A computer readable medium storing a program for causing a computer to transferring a second digital certificate to a communication apparatus storing a first digital certificate which is different from the second digital certificate, the program comprising:

requesting code means for requesting issuance of the second digital certificate and identifying information of a communication destination to be transferred to the communication apparatus; and program code means for transferring, to the communication apparatus via a safe communication channel established by using the first digital certificate, the second digital certificate and identifying information of a communication destination which the communication apparatus should access for communicating with the computer by using the second digital certificate, wherein the communication apparatus disconnects the safe communication channel upon receipt of the second digital certificate and identifying information of a communication destination.

* * * * *